Figure 9:
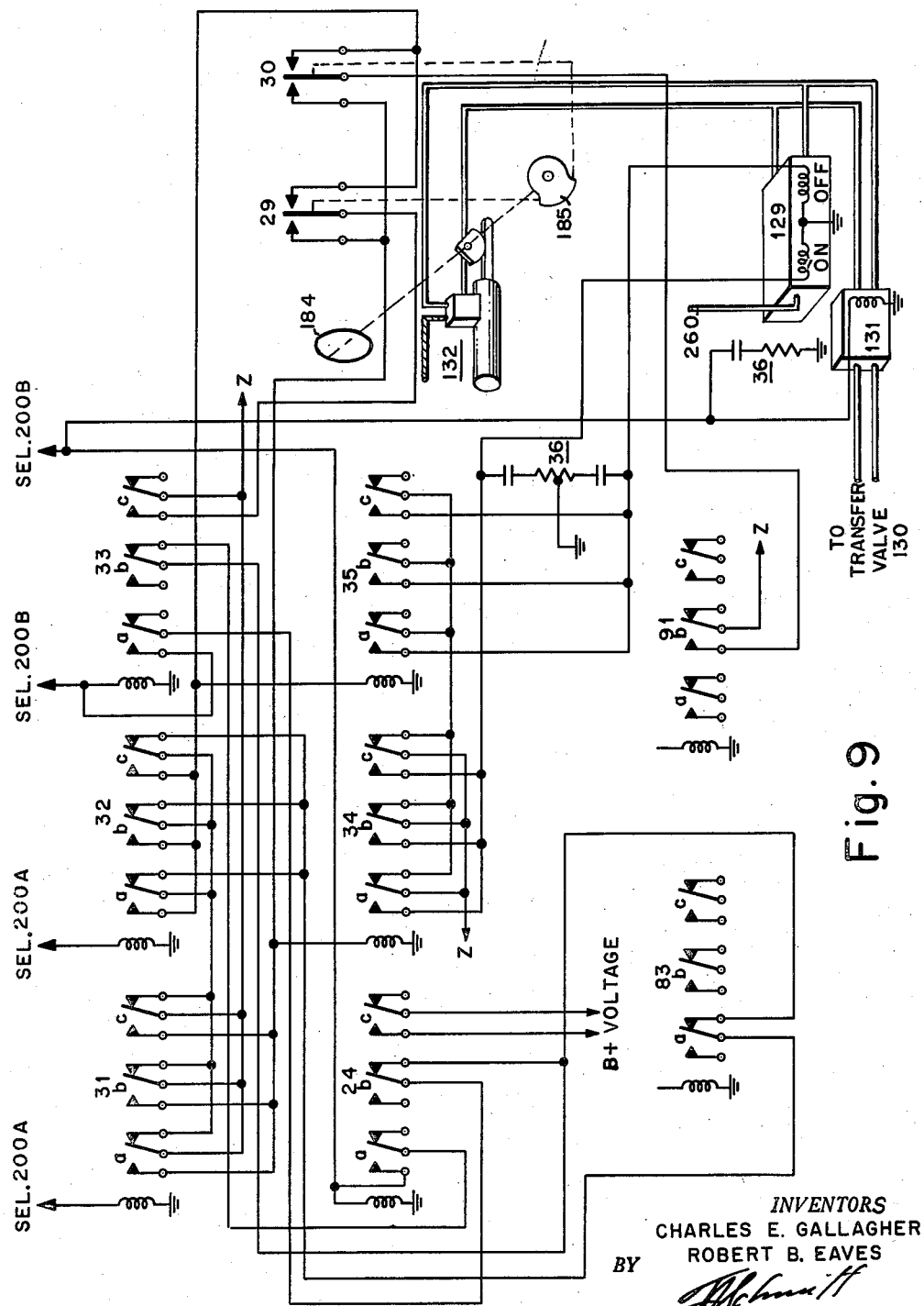

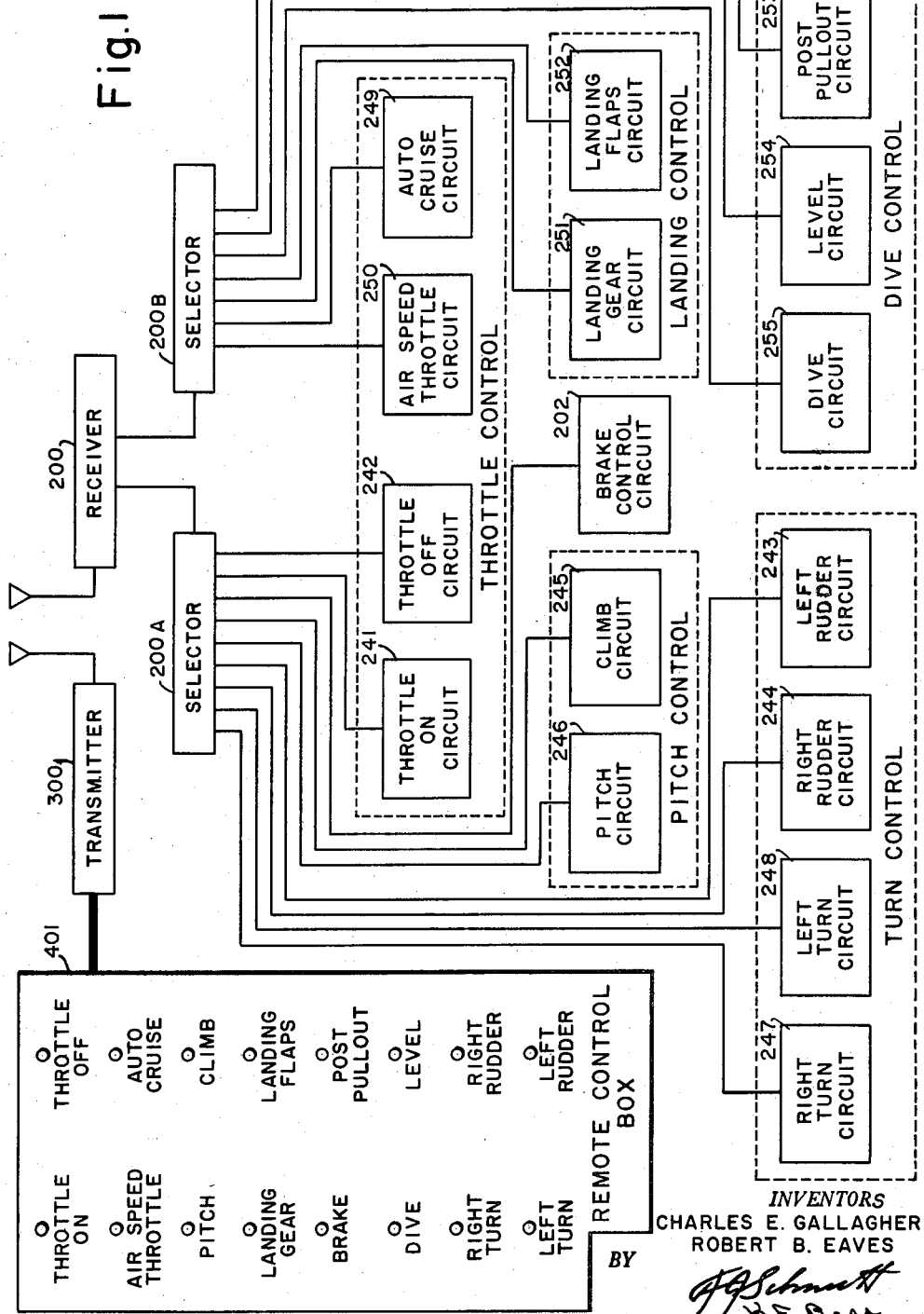

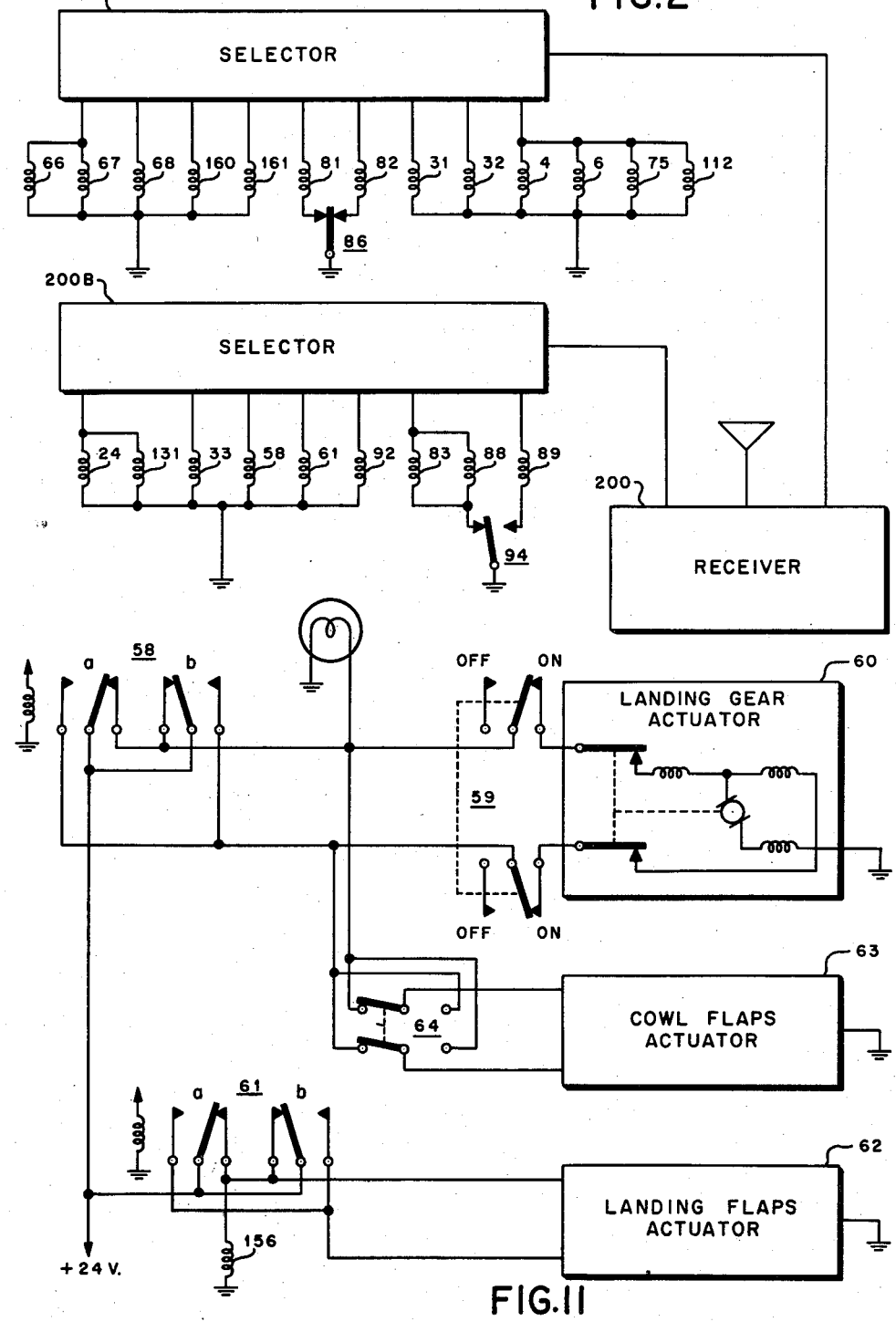

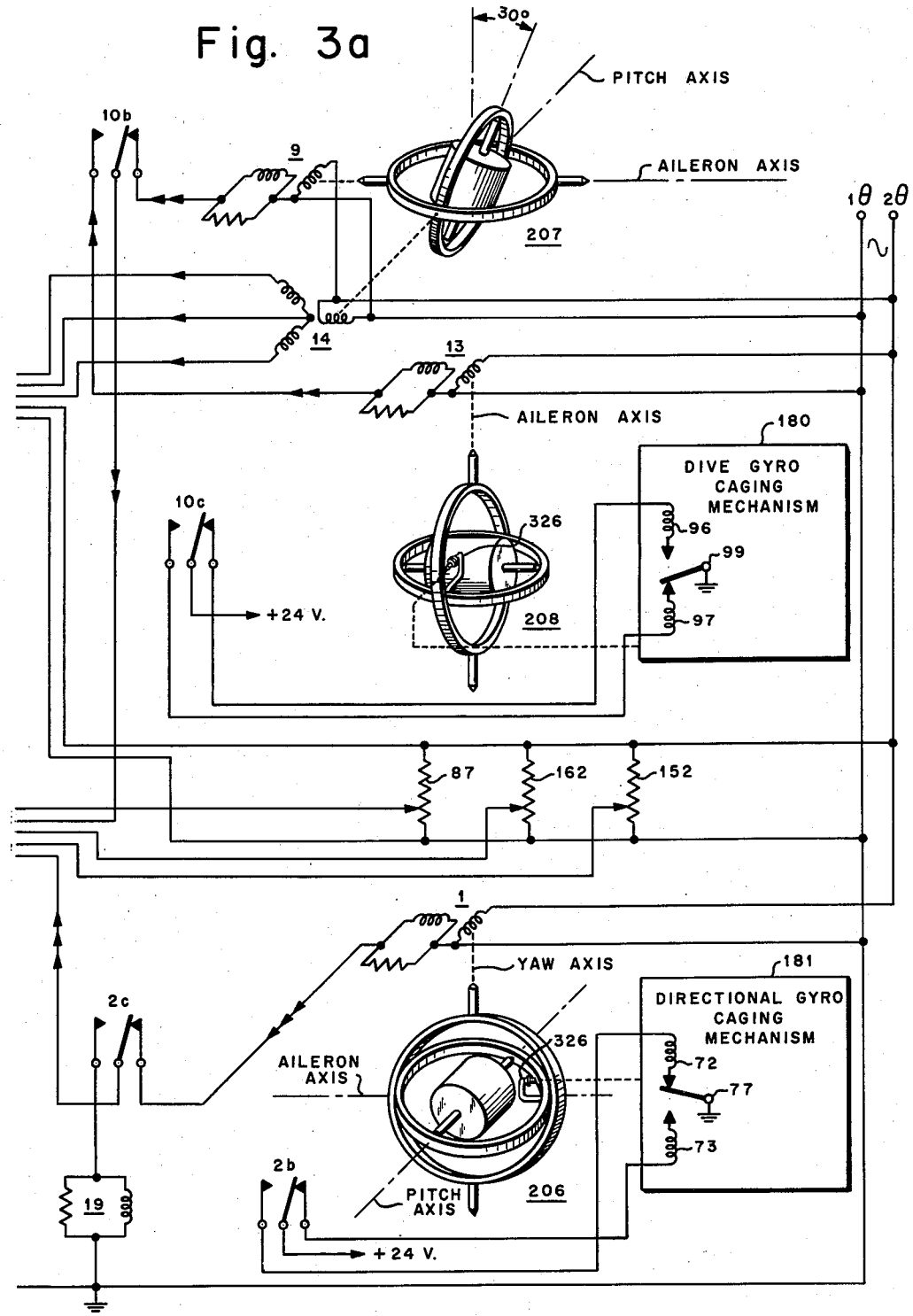

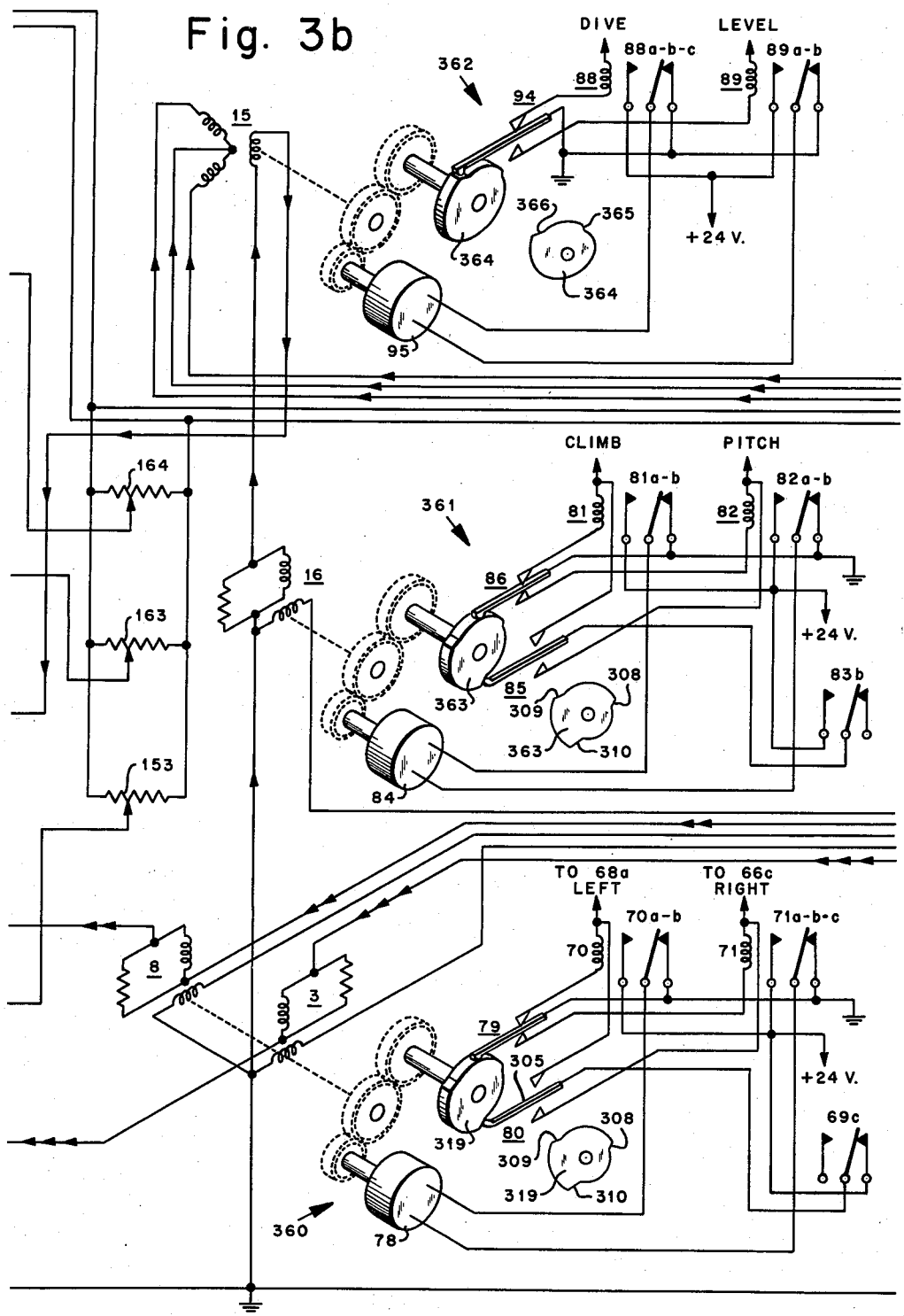

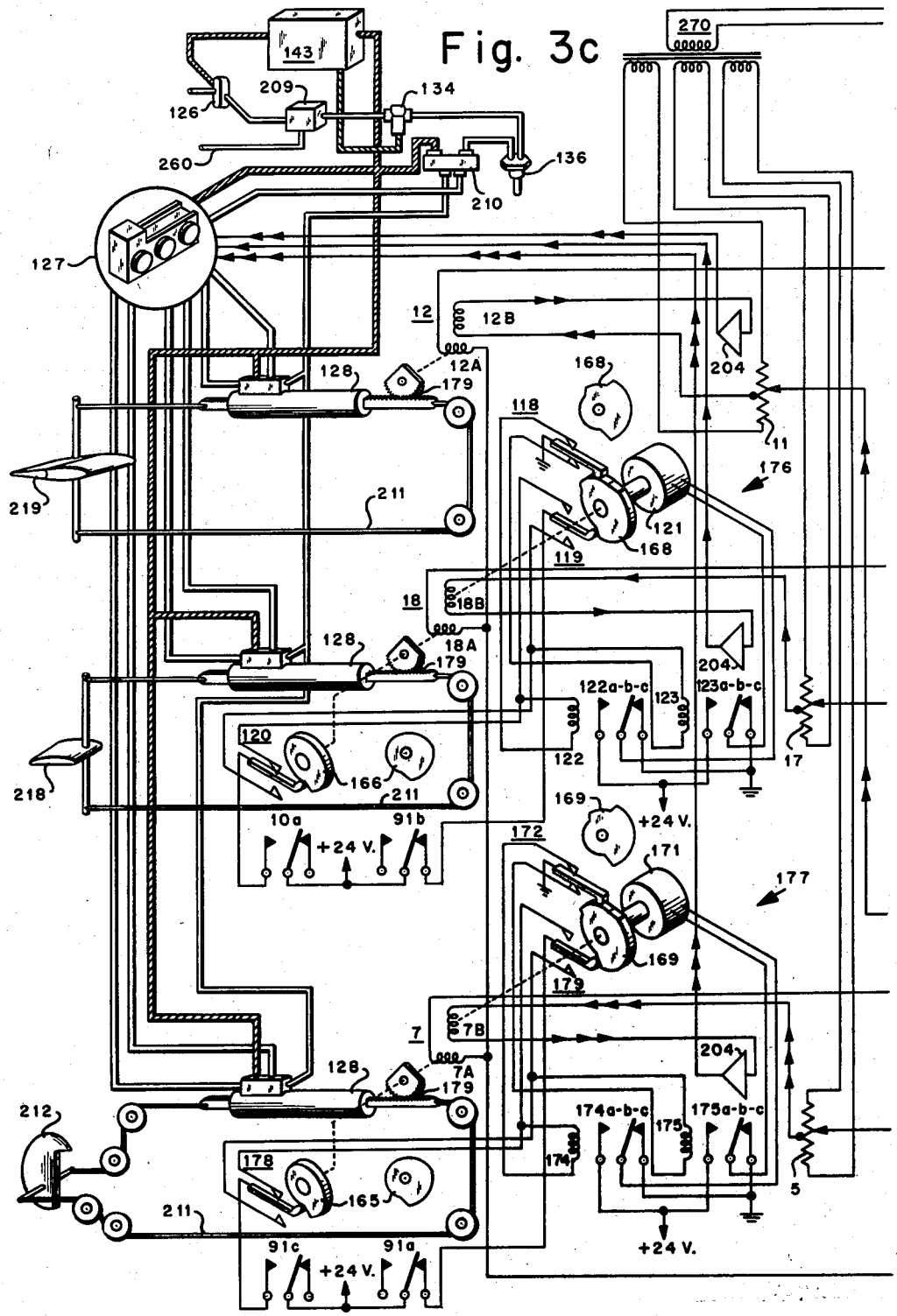

Fig. 4a
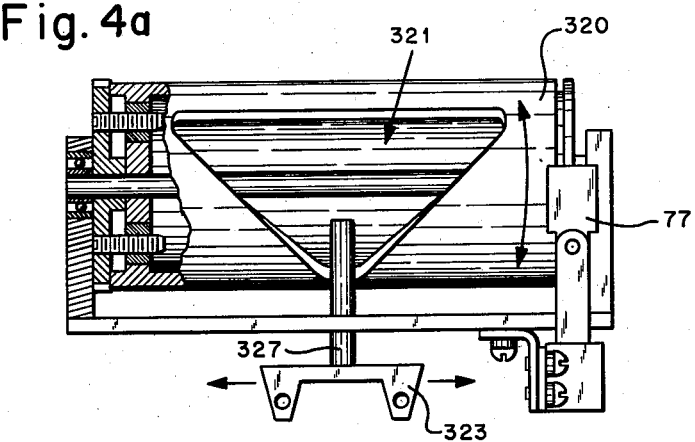
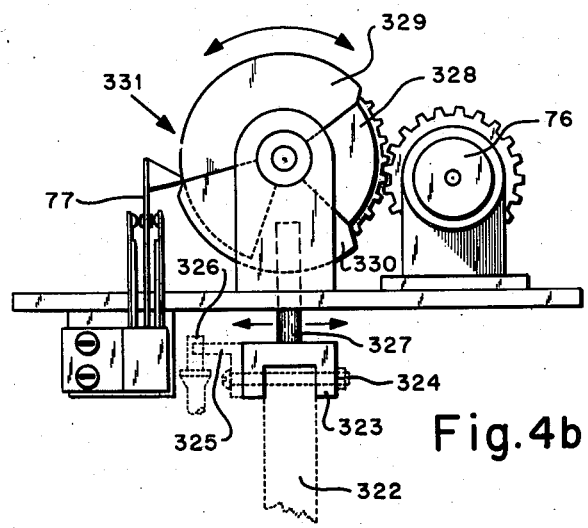
Fig. 4b

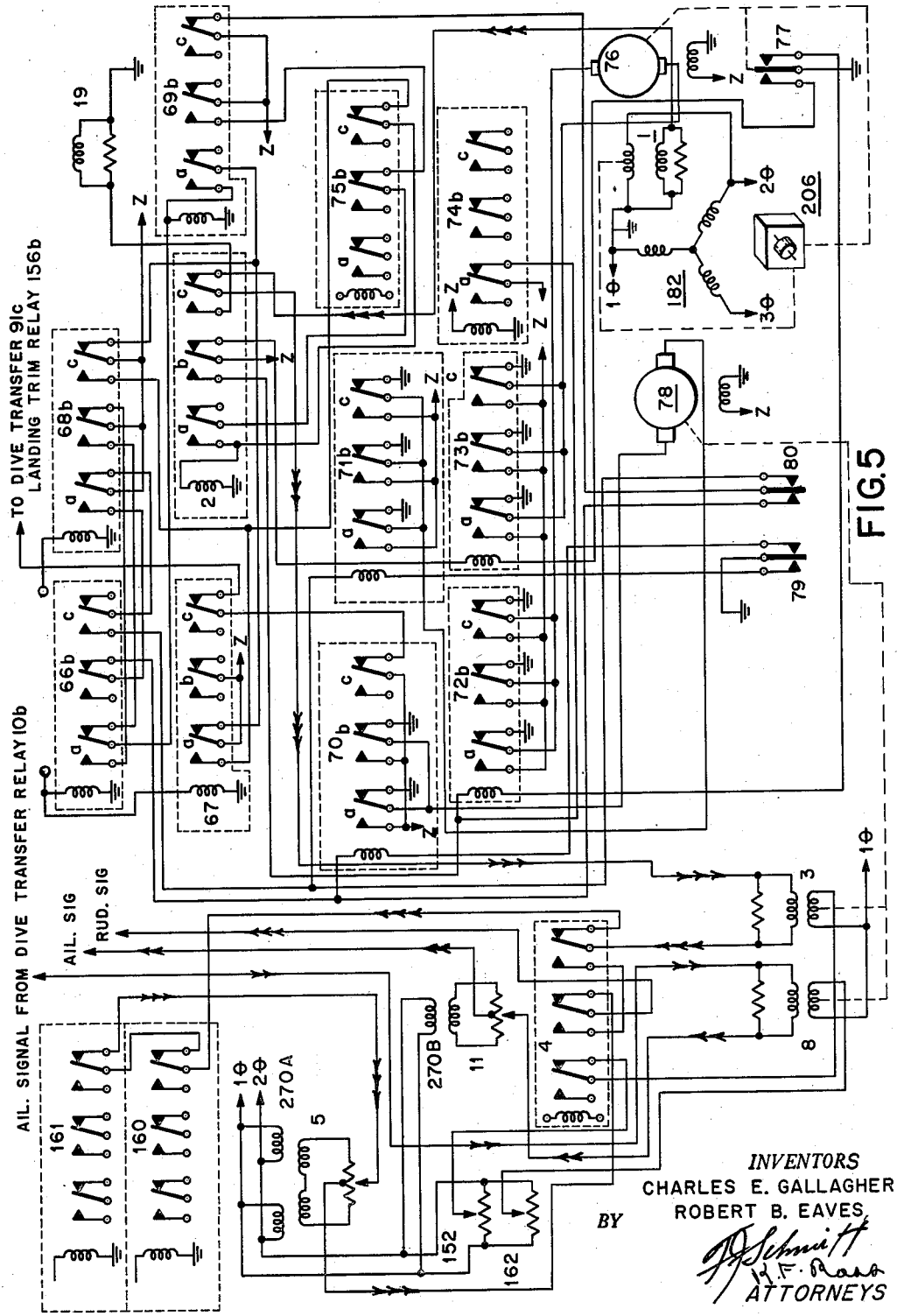

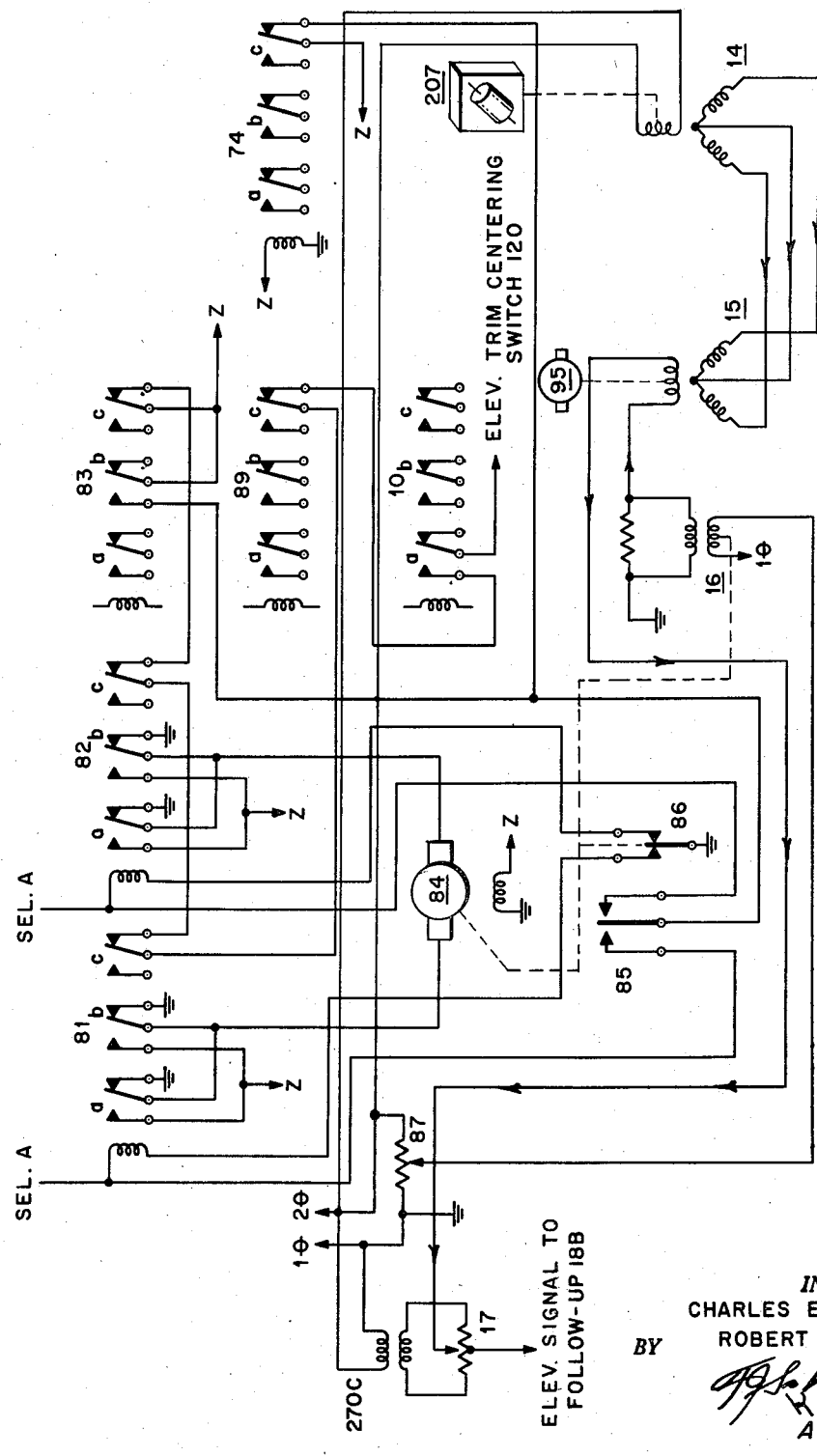

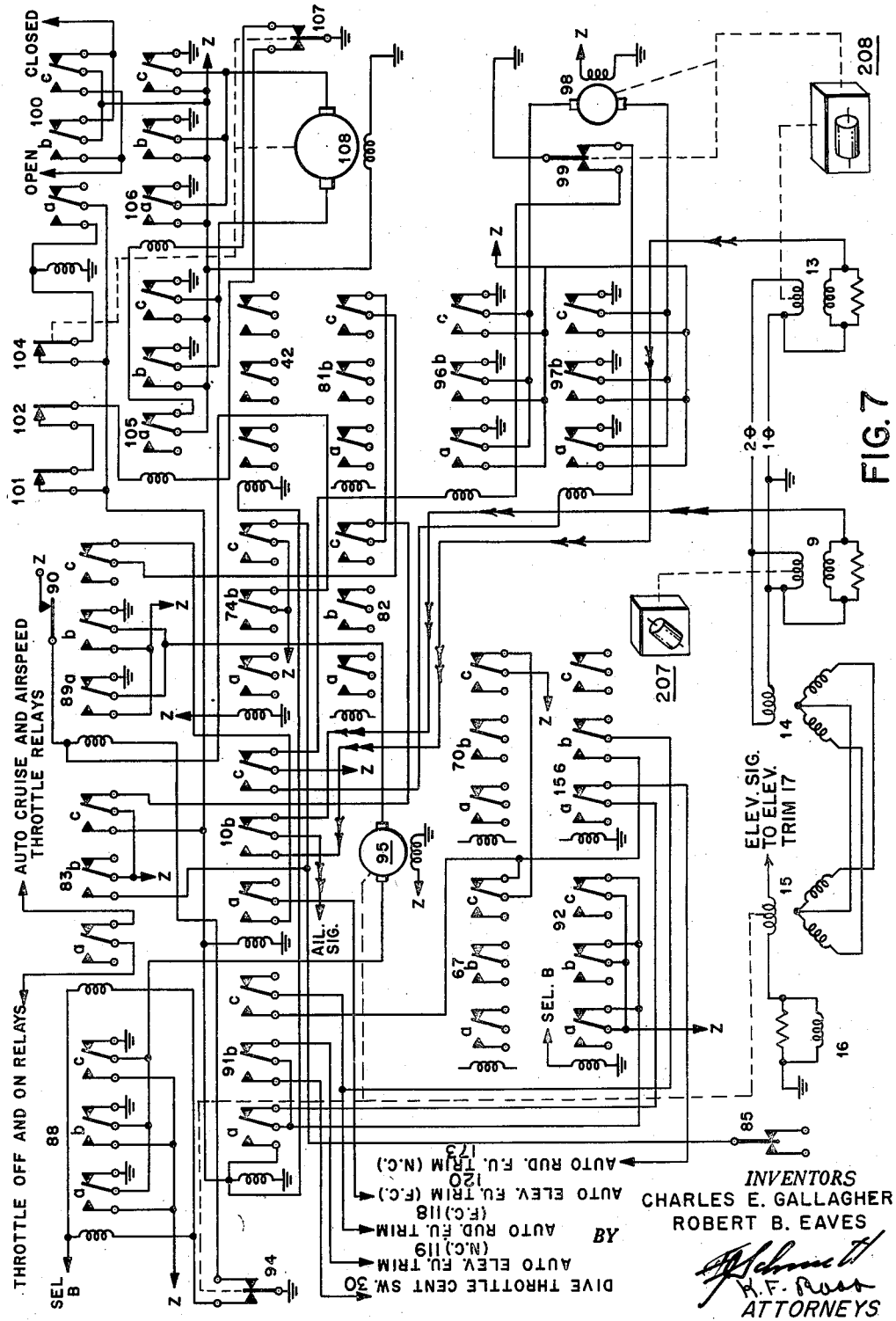

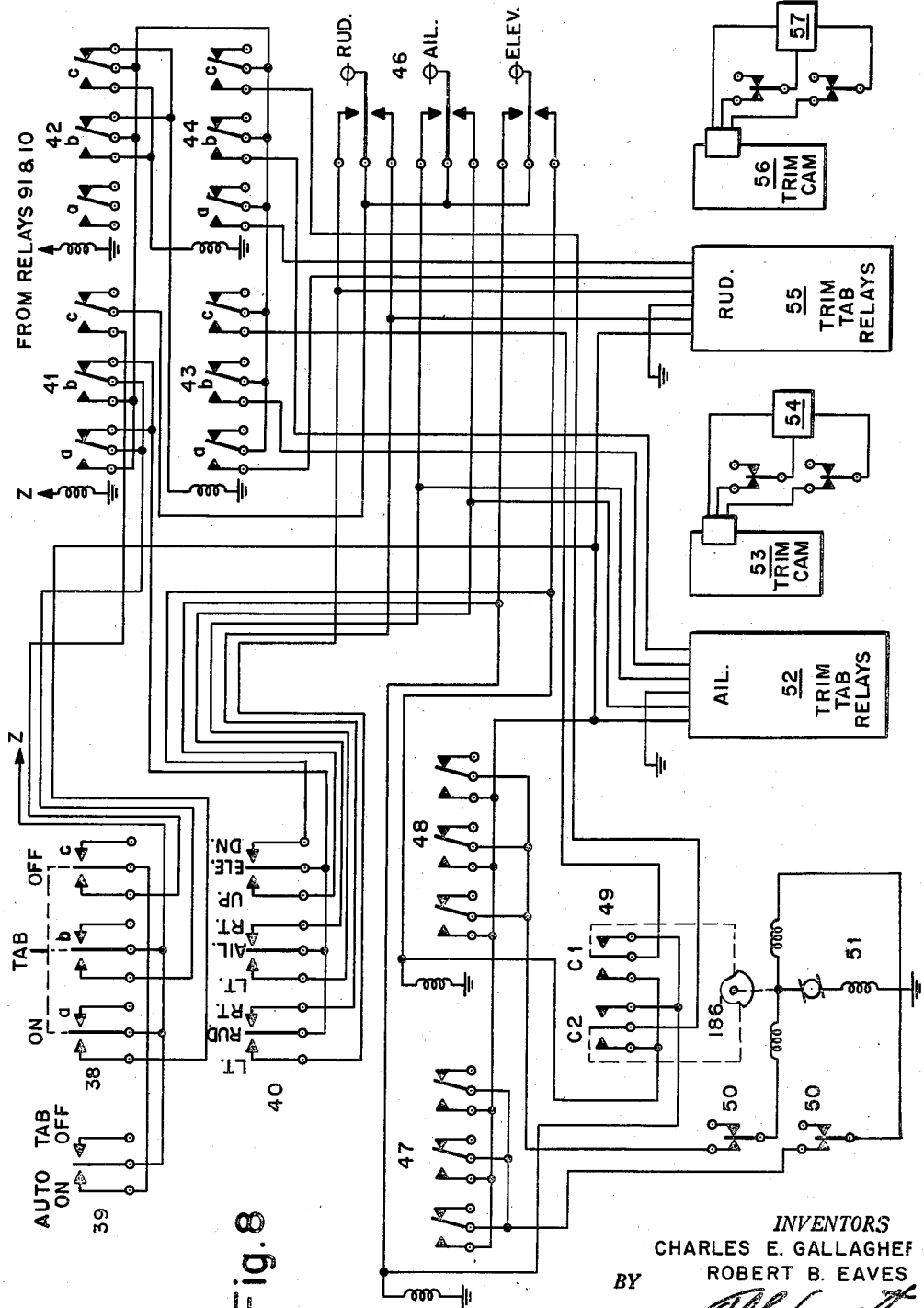

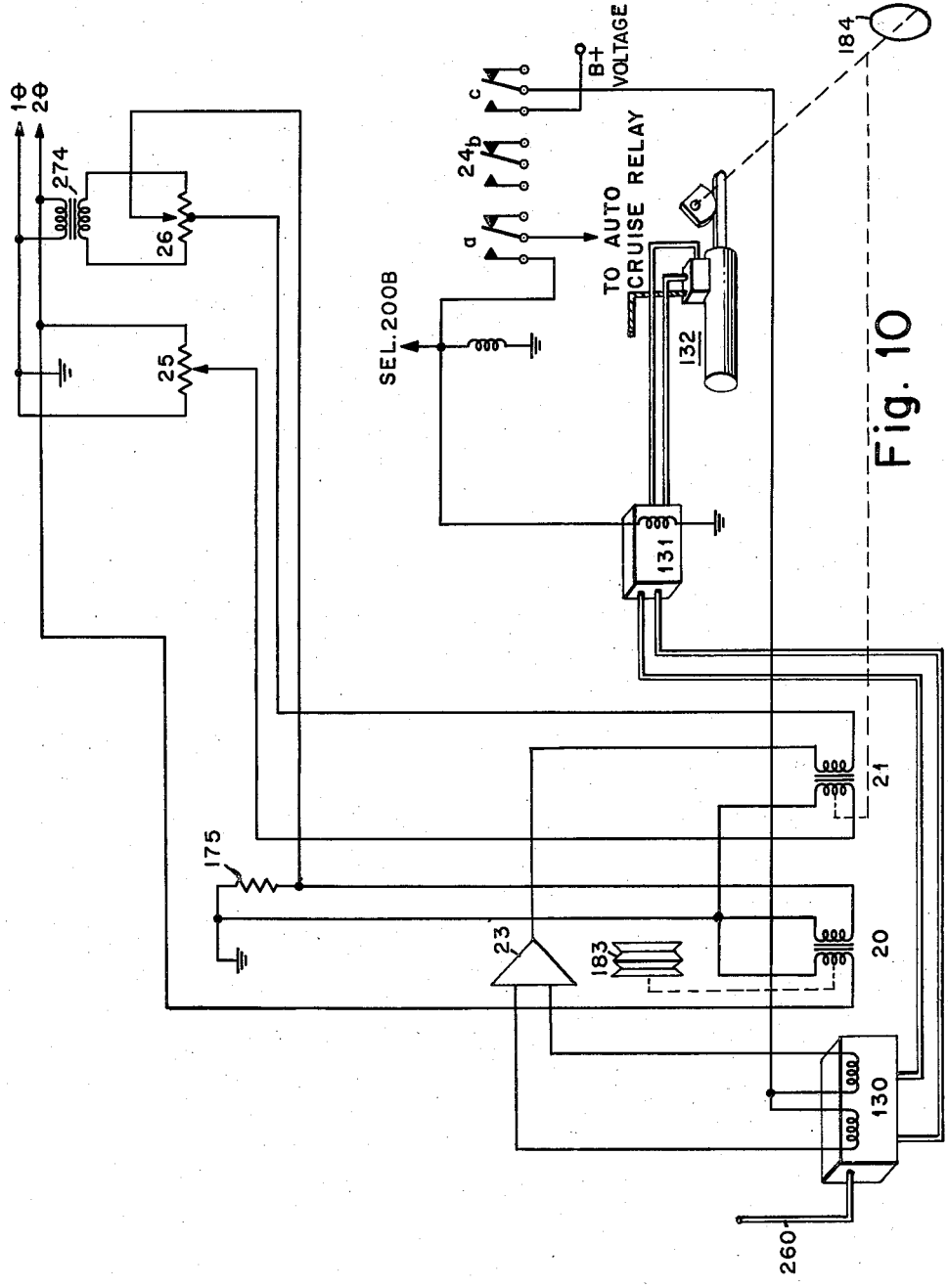

Jan. 31, 1961  C. E. GALLAGHER ET AL  2,969,934
REMOTE CONTROL SYSTEM FOR AIRCRAFT
Filed July 24, 1953  14 Sheets-Sheet 13

INVENTORS
CHARLES E. GALLAGHER
ROBERT B. EAVES
BY
F. Schmitt
H. F. Ross
ATTORNEYS Jan. 31, 1961

C. E. GALLAGHER ET AL 2,969,934

REMOTE CONTROL SYSTEM FOR AIRCRAFT

Filed July 24, 1953

14 Sheets-Sheet 14

INVENTORS
CHARLES E. GALLAGHER
ROBERT B. EAVES

BY

ATTORNEYS

United States Patent Office 2,969,934
Patented Jan. 31, 1961

2,969,934

REMOTE CONTROL SYSTEM FOR AIRCRAFT

Charles E. Gallagher, 344 Court St., Doylestown, Pa., and Robert B. Eaves, 620 Aintree Road, Hatboro, Pa.

Filed July 24, 1953, Ser. No. 370,238

21 Claims. (Cl. 244—77)

(Granted under Title 35, U.S. Code (1952), sec. 266)

The invention described herein may be manufactured and used by or for the Government of the United States of America for governmental purposes without the payment of any royalties thereon or therefor.

This invention relates to remote control systems for aircraft and more particularly to a remote control system for operation of drone or pilotless aircraft through desired extreme maneuvers such as vertical dives and pull-outs therefrom.

Various types of automatic control systems have heretofore been used in conjunction with remote control apparatus for providing radio control or guidance of a pilotless aircraft. While the degree of control in executing changes in the attitude of a pilotless aircraft is generally satisfactory under normal circumstances or wherein the imposed operating conditions are not severe, an inherent limitation of existing systems, and in particular those employing gyroscopic instrumentalities for establishing a reference set of coordinate axes is an inability to provide for a desired latitude of maneuverability, especially with respect to the capability of the aircraft to execute a vertical dive, a maneuver deemed to be tactically desirable. This limitation arises from the characteristic manner employed in the mounting of a displacement type gyroscope on coordinate sets of gimbals which are at right angles to each other so that the autosyn pickoff associated with a particular axis exhibits a decreasing sensitivity to changes in the attitude of the aircraft, as the reference plane in which the pickoff is located is translated into another plane. For example, in an automatic pilot control system having a normal bank and climb gyroscope with a vertically disposed spin axis for establishing a set of reference axes for sensing directions or more particularly sensing pitch and roll about the lateral and longitudinal axes, respectively, of an aircraft in horizontal flight, this gyroscope will exhibit little or no control with respect to roll when the aircraft is in a vertical dive attitude, since the spin axis of the normal bank and climb gyroscope will in this attitude of flight be coincident with the fore and aft axis of the aircraft. The instant invention, therefore, provides structure which substantially overcomes this inherent limitation, and in addition, other subordinate features have been incorporated which greatly enhance the performance capabilities of a pilotless aircraft.

The remote control system of the instant invention constitutes an improvement to a basic automatic pilot of the type described in Patent No. 2,416,097, issued to A. Hansen, Jr. et al. In evolving the instant invention, the automatic pilot system, as noted, has been appropriately modified to provide for radio control or guidance of a pilotless aircraft incorporating the instant invention therein, and, in addition, a considerable latitude in the maneuverability of a pilotless aircraft, particularly in its capability to execute a vertical dive maneuver, is afforded by the embodiment of a supplemental dive gyroscope which is instrumental in supplying information pertinent to the roll of the aircraft about its fore and aft axis when in a dive attitude. A bank and climb gyroscope with its spin axis inclined in approximately a 30° climb attitude with reference to the aircraft longitudinal axis is also employed to permit greater freedom in pitch in lieu of a conventional bank and climb gyroscope with a vertically disposed spin axis. A conventionally mounted directional gyroscope is used to establish a yaw reference for sensing deviations about the vertical axis of the aircraft. The displacement information which is thus normally supplied in the form of an induced alternating voltage in an autosyn pickoff associated with a particular gyroscope is augmented by a voltage generated as a direct function of the particular radio command being transmitted. The resultant voltage is subsequently applied through a follow-up unit to an electronic servo amplifier having in the output stage a solenoid transfer valve, instrumental upon energization thereof to control a hydraulic servo, which is effective to actuate a primary control surface of the aircraft. Thus, change in attitude of the aircraft is effected in direct response to the particular radio command being keyed. In order to permit the execution of specific maneuvers, including a vertical dive, the instant invention provides for an automatic caging mechanism for caging, or immobilizing, the dive and directional gyroscopes, as required. It is noted further that the transmitter and receiver as used in the inventive remote control system is of a conventional type known in the art and is significant only as the instrumentality for carrying out the radio command function of the instant invention.

Accordingly, one purpose of this invention is to provide a system for remotely controlling an aircraft through a vertical dive.

Another object of the present invention is to provide a system whereby a pilotless aircraft may be placed through a vertical dive without excessive skid or slip, the vertical flight thereof being maintained substantially coincident with a normal to the earth's surface.

A further object of the present invention is to provide an appropriate engine throttle setting during the execution of a vertical dive.

Another object of the invention is to provide a system whereby a pilotless aircraft in a vertical dive is automatically self-recovering when a predetermined lower altitude level has been traversed.

Still another object of the invention is the provision of a dive recovery means which is instrumental to actuate dive recovery flaps if after a predetermined time interval the pilotless aircraft has not responded to pullout by normal control means.

A final object of the invention is to provide means for remotely controlling a pilotless aircraft through all types of operation and maneuvers which could normally be performed by a human pilot.

Figure 12:
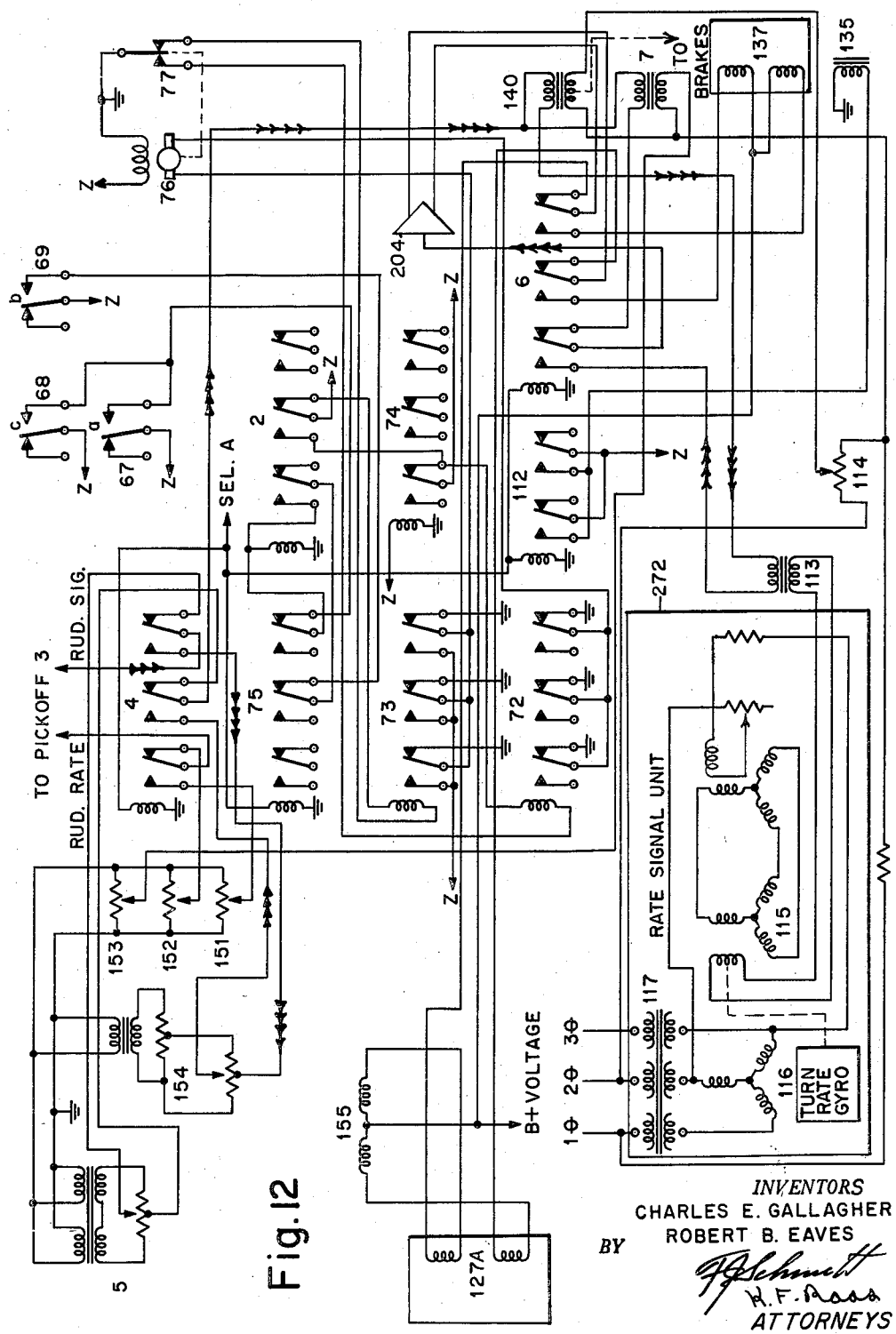
Figure 13:
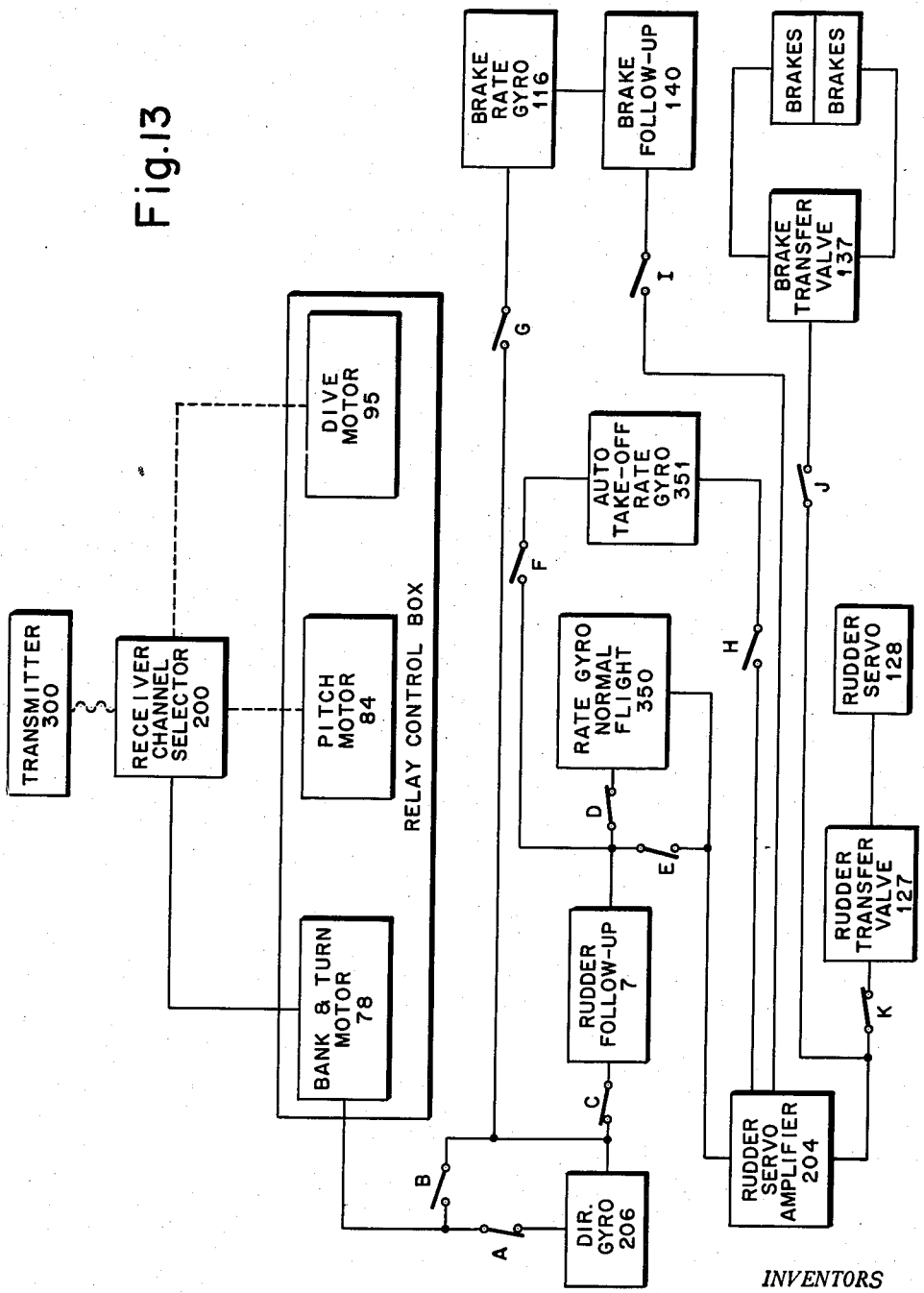

The exact nature of this invention as well as other objects and advantages thereof will be readily apparent from consideration of the following specification relating to the annexed drawing in which:

Fig. 1 is a general block diagram presentation of the electical circuits contained in the instant remote control system, Fig. 2 is a schematic representation of conventional receiving apparatus including frequency sensitive selectors 200A and 200B, which are responsive upon receipt of appropriate radio command to energize the illustrated relay coils instrumental to initiate the operation of the respective circuits designated broadly by representative blocks in Fig. 1, and in greater detail in Figs. 3a, 3b, 3c, 5, 6, 7, 9, 10, 11 and 12, Figs. 3a, 3b, and 3c depict an illustrative embodiment of the instant remote control system, showing in partial isometric composite presentation the significantly novel structural features thereof, and are intended to illustrate generally the manner in which the remote control system operates to control the primary surfaces of a pilotless aircraft in response to various command signals, Figs. 4a nd 4b are elevation and end views, respectively, of the gyroscope caging mechanism of the instant invention, Fig. 5 is a detailed electrical schematic diagram of the turn circuits, Fig. 6 is a detailed electrical schematic diagram of the pitch and climb circuits, Fig. 7 is a detailed electrical schematic diagram of the dive, level, and post pullout circuits, Fig. 8 is a detailed electrical schematic diagram of the trim tab circuits, Fig. 9 is a schematic diagram of the throttle circuits for controlling aircraft engine speed, Fig. 10 is a schematic diagram of the air speed throttle circuit, Fig. 11 is a schematic diagram of the circuits for effecting operation of the landing gear, landing flaps, and engine cowl flaps, Fig. 12 is a schematic diagram of an existing type differential braking system modified for remote control application, and Fig. 13 presents a diagrammatic representation of the system for introducing rate signals into the automatic pilot and other mechanisms.

Referring now to the drawings wherein like reference characters designate like or corresponding parts throughout the several views, there is shown in Fig. 1 a general block diagram presentation of the several circuits employed in the remote control system of the instant invention to accomplish the various maneuvers including the execution of a vertical dive, and other concommitant operations necessary to continuously insure the positive radio guidance of a pilotless aircraft. The inventive remote control system, as such, will be observed in Fig. 1 to comprise 16 major circuits, each of which is responsive to a particular radio command, as may be selectively keyed from the panel of remote control box 401. Transmitter 300 is of a conventional design capable of radiating the desired electromagnetic intelligence in accordance with the particular channel frequency assigned a specific command. Receiver 200 is capable of receiving the electromagnetic intelligence as radiated by transmitter 300, and the signal output of receiver 200 is applied to frequency sensitive selector 200A and selector 200B, wherein the signal undergoes frequency selection. The frequency sensitive elements in these selectors may constitute high Q resonant circuits, or crystal filters well known in the radio art and hence it is deemed sufficient for the purposes of this description merely to note that the demodulated signal is instrumental ultimately to actuate specific relays illustrated in Fig. 2 and elsewhere which initiate the operation of the various circuits indicated in Fig. 1. A discussion of these circuits will first be given in general terms with a more detailed treatment of the structure and operation thereof to follow subsequently in relation to other more detailed figures of the drawing.

The throttle control circuits grouped under the designation of a throttle control unit in Fig. 1 include a throttle On circuit 241, a throttle Off circuit 242, an air speed throttle circuit 250, and an auto cruise circuit 249. The throttle On and throttle Off circuits, 241 and 242, respectively, control the actuation of a throttle valve, between the fully closed and the fully opened valve positions as a direct function of keying time in response to appropriate radio commands, thereby effecting a primary control over engine speed. The air speed throttle circuit 250 comprises an electro-hydraulic servo system which is responsive upon radio command to maintain the throttle valve at a setting commensurate with a predetermined flight speed. The automatic cruise circuit 249 is comprised essentially of an electro-mechanical servo having a rotatable cam, the contoured surface of which governs the choice of either of two preset throttle valve positions, automatic cruise or a dive position which may be a cutback throttle valve setting. The latter is used when the aircraft is directed to execute a vertical dive maneuver. Thus, the throttle control unit constitutes a paramount instrumentality in the remote control operation of a pilotless aircraft.

The pitch control unit is concerned with movement of the aircraft about its lateral axis. In normal flight, the function of this unit is comparable to that of a conventional autopilot, performing corrective action as necessary to maintain a datum attitude in pitch, but in the instant invention, it also imparts to the aircraft a desired angle of climb or depression by introducing into the elevator signal path a voltage appropriate in sense and magnitude in direct response to climb and pitch command signals, respectively. Specifically, the climb circuit 245 effects a climb attitude, while conversely, the pitch circuit 246 effects, within prescribed limits, the desired angle of depression in the flight attitude of the aircraft. When tactical considerations compel the execution of a dive maneuver in excess of the prescribed limit, as a vertical 90° dive, for example, the dive control feature of the remote control system comprising dive circuit 255, level circuit 254, and post pullout circuit 253, is employed. Dive circuit 255 is responsive upon receipt of a dive command signal supplied from the frequency discriminating selector 200B to augment the signal voltage of the elevator signal path, initiating thereby a fixed rate of angular depression of the nose of the aircraft. Simultaneously, specific relays provided in the dive circuit enable the normally caged supplemental dive gyroscope to be uncaged, permitting aileron or roll information to be originated with this gyroscope. The level circuit 254 functions essentially to re-establish the voltage in the elevator signal path as it existed prior to commencing the dive maneuver, consequently effecting return of the aircraft to its original datum attitude. The post pullout circuit 253 culminates the dive and level operations by restoring the respective circuits associated therewith to the quiescent state. Moreover, an automatic dive recovery circuit may be integrally incorporated as part of the remote control system to provide for automatic dive recovery, if the aircraft has not pulled out in response to normal control means after a predetermined time interval, and, in addition, structure is provided for automatic rudder and elevator follow-up trim commensurate with aerodynamic requirements in the vertical dive flight attitude of the aircraft.

The turn control unit includes the circuits employed for carrying out maneuvers involving turns accompanied with the proper degree of bank. The right and left turn circuits 247 and 248, respectively, comprise the electrical components necessary for introducing upon command an appropriate signal voltage into both the rudder and aileron signal paths of an automatic pilot. Provision has been included for automatic caging of the directional gyroscope during turn maneuvers. The left and right rudder circuits 243 and 244, respectively, afford direct actuation of the rudder, enabling a full amount of fixed rudder displacement to be applied.

These circuits are not illustrated elsewhere in any greater detail since the express manner in which the left and right rudder function is accomplished is conventional, and known in the art; it will suffice merely to say that relay coils 160 and 161 shown in Fig. 2 are instrumental in initiating this particular action in circuits 243 and 244, respectively. The brake control unit 202 is of the type illustrated in Patent No. 2,444,927 issued to C. E. Gallagher. The automatic braking system as therein disclosed, has been appropriately modified to render it capable of being operated remotely in response to a brake radio command signal. The brake control unit as thus adapted to a pilotless aircraft provides for a differential brake pressure to be applied to the wheels, thereby aiding in maintaining the aircraft on a straight path after the wheels have touched the runway.

Finally, the landing control unit of the remote control system incorporates a landing gear circuit 251 and landing flaps circuit 252. In addition to carrying out its specifically assigned function of operating a rectractile landing gear, landing gear circuit 251 also provides for the concurrent actuation of the engine cowl flaps, effecting thereby some measure of regulation over engine temperature. The landing flaps circuit 252 is responsive to actuate the landing flaps and includes provision for automatic compensation of the rudder follow-up due to change in the trim position of the rudder occasioned by change in airspeed during landing.

The significantly novel aspects of the several enumerated circuits as thus summarily described with respect to Fig. 1, and the combinative integration thereof to form the instant remote control system possessing the unique operational capabilities as herein previously set forth, will be more apparent in the subsequent detailed description pertaining to the structure and operation of these circuits.

The presentation in Fig. 2 is intended to identify the excitation of particular relays which are effective to initiate a programmed sequence of events in response to the specific radio command signals received by receiver 200. Thus, frequency sensitive selectors 200A and 200B are instrumental to energize a particular relay coil, the contacts of which, not shown in Fig. 2, bring into operation specific circuits contributing to the execution of the command as remotely keyed. Therefore, it is fundamental to note that the following relationship exists between the numerically designated relay coils shown in Fig. 2 and the 16 command signals associated therewith.

| Command signal: | Initiating coil |
|---|---|
| Right turn | 66, 67 |
| Left turn | 68 |
| Left rudder | 160 |
| Right rudder | 161 |
| Climb | 81 |
| Pitch | 82 |
| Throttle On | 31 |
| Throttle Off | 32 |
| Brakes | 6, 4, 75, 112 |
| Air speed throttle | 24, 131 |
| Automatic cruise | 33 |
| Landing gear | 58 |
| Landing flaps | 61 |
| Post pullout | 92 |
| Dive | 88, 83 |
| Level | 89 |

A schematic representation in partial isometric form of the significantly novel structural features of the remote control system of the instant invention is illustrated in a composite showing making up Figs. 3a, 3b, and 3c. This basic showing of inter-related components is intended to illustrate generally the manner in which the inventive remote control system operates to control the primary surfaces of a pilotless aircraft in response to right and left turn, dive, level, climb, and pitch command signals. As illustrated, the inventive remote control system employs a basic automatic pilot of the type described in Patent No. 2,416,097, issued to A. Hansen, Jr. et al. In horizontal flight, the automatic pilot in accordance with recognized operating characteristics thereof performs its specifically assigned task of maintaining the aircraft's datum attitude, and in this respect, there is schematically illustrated in Fig. 3a a directional gyroscope 206 with a horizontally disposed spin axis, the purpose of gyroscope 206 being to sense deviations in yaw about the vertical axis of the aircraft in accordance with established gyroscopic principles. A conventional single phase inductive pickoff 1 comprising a rotor and a stator winding is illustrated in a null or perpendicular relationship. The rotor of pickoff 1 is schematically shown to be mechanically connected to a pivot of the outer gimbal of gyroscope 206 by the dotted line notation employed throughout the drawing to denote the presence of mechanical couplings or drives.

The usual arrangement of a bank and climb gyroscope is such that it rotates about a vertical spin axis perpendicular to the aileron or longitudinal axis of an aircraft in straight and level flight. This arrangement is predicated on the fact that the gyroscope has a stable range somewhat less than 180° and this configuration permits equal excursions from level flight in climbing and diving attitudes without exceeding the stable range of the bank and climb gyroscope. However, in the instant invention, which requires excursions in the diving attitude up to and beyond 90° from straight and level flight, gyroscope 207 is mounted as diagrammatically shown in Fig. 3a with its spin axis inclined forwardly about 30° from a vertical axis or, as compared to a conventional installation, in approximately a 30° climb attitude with reference to the aircraft's longitudinal axis. This particular manner of mounting provides for conventional sensing of deviations in pitch and roll of the aircraft in ordinary flight, and in addition, affords effective gyroscope response in pitch over a range of diving attitudes in excess of 90° from straight and level flight, particularly advantageous when the aircraft is disposed in a vertical dive attitude. The rotors of pickoffs 9 and 14 are mechanically connected to the bearing pivots of the outer and inner gimbals, respectively, the stator of inductive pickoff 14 being a conventional two phase three terminal type with stator windings disposed at right angles to each other. In symmetrical disposition relative to the rotor as portrayed in Fig. 3a, the stator of pickup 14 will have balanced voltages induced therein. It should also be noted with respect to the inclined bank and climb gyroscope 207 that a conventional erection means, although not illustrated herein, may be employed to maintain the spin axis at a constant angle with a tangent to the earth's susface. Thus, the error directly introduced into the automatic pilot system due to curvature of the earth may be obviated by incorporation of a conventional erection means.

In addition to the gyroscopic means applicable to conventional flight, a dive gyroscope 208 is illustrated in Fig. 3a, the paramount function of which is to supply roll or aileron information when the aircraft is disposed in a vertical dive attitude. The relative orientation assumed by gyroscope 208 in the vertical dive flight attitude is as portrayed in Fig. 3a, or, that is to say, the dive gyroscope spin axis in dive disposition of the aircraft is inclined normal to the intersection of the lateral and longitudinal axis of the aircraft. A conventional single phase inductive pickoff 13 is utilized. The rotors of pickoff 13 as well as those of pickoff 1, 9, and 14, are connected to a common suitable source of alternating current excitation herein denoted by the energized bus labeled 1θ and 2θ. The resistors shown in parallel connection with the stator windings of the above pickoffs are for the purpose of improving uniformity of phase characteristics. The parallel impedance 19 constitutes a dummy load and is identical in electrical respects to the stator of pickoff 1.

Automatic caging mechanisms 180 and 181, illustrated schematically in Fig. 3a, are utilized to cage, or immobilize, the dive and directional gyroscopes respectively, as operationally required in the execution of dives and turns. The units are identical and differ only in application. The caging mechanisms are denoted in mechanical coupling relation with pin 326 of the respective gyroscopes, the mechanical engagement being made upon completion of the caging cycle, an operation discussed with greater particularity below in connection with Fig. 4a and Fig. 4b. With respect to the general schematic presentation Fig. 3a of the dive and directional gyroscope caging mechanisms, it should be noted that coils 73 and 97 are partial showings of relays, the contacts of which not herein illustrated, initiate the operation of the respective associated caging mechanisms when contacts 2b and 10c, shown in deenergized position, are closed by energization of the respective relay coils cooperating therewith for connection with a 24 volt direct current source. In a similar sense, coils 72 and 96 are effective to initiate conjugate operation of the directional and dive gyroscopes, respectively, when relay contacts 2b and 10c, are in deenergized position as indicated, by virtue of the absence of relay coil excitation. The normally closed contacts 99 and 77 of caging mechanisms 180 and 181, respectively, are limit switches, effective to terminate the caging operation at a precise point in the caging cycle.

In the instant invention, a relay nomenclature has been adopted wherein the numerical prefix designates the relay per se, and the contacts thereof are assigned lower case alphabetical characters in progressive order from left to right. Thus, contacts 2b and 10c are the contacts b and c of relay coils 2 and 10, respectively.

Fig. 3b shows the signal insertion means comprising mechanisms 360, 361, and 362 which are effective upon keyed command to introduce an alternating current E.M.F. into the respective signal paths, to thereby effect change in the attitude of the aircraft about the respective control axes. The selectively operable signal insertion mechanisms are essentially similar having but minor variations. The signal insertion mechanism 360 as illustrated is mechanically coupled in common with the rotors of rudder pickoff 3 and aileron pickoff 8. The signal insertion mechanism 361 is shown connected to drive the rotor of elevator pickoff 16, while in a comparable connection, mechanism 362 is coupled to the rotor of the two phase pickoff 15. The excitations supplied the rotors of pickoffs 3, 8, and 16 are derived from rudder rate potentiometers 152, 162, and 87, respectively, which are provided to regulate sensitivity of the signal paths for the respective control axes, and thereby the amount of control surface displacement in response to command signals.

With respect to the intrinsic operation of the respective signal insertion mechanisms, Fig. 3b depicts a fragmentary portion of the essential electrical circuits necessary to evince the operation thereof. In this regard, it is noted that the alphabetical designation of relay coil contacts as collectively shown in Fig. 3b is intended to indicate that these contacts are in parallel connection, affording in the instant invention not only the convenience of utilizing a standard uniform type of relay throughout, but also, where circuit practicality permits, greater reliability of operation due to parallel contact paths. In the operation of the right and left turn signal insertion mechanism 360, therefore, which is illustrative of operation of the companion mechanisms 361 and 362, motor 78 rotates to produce clockwise rotation of cam 319, for instance, in the case of the right turn maneuver when parallel contacts 71a—b—c are closed to the energized position upon excitation of the coil of relay 71, supplying 24 volts D.C. through the deenergized 70a—b contacts to ground. Relay 71 is energized through contact 66c, the coil of the relay embracing this contact is shown in Fig. 2, and is energized upon receipt of a right turn command signal. Concurrently, with excitation of relay 71, contact 69c disrupts the 24 volt source, which normally supplies a centering voltage to the common contact 305 of centering switch 80 for the purpose of returning cam 319 to its initial position and thereby rendering a null or perpendicular relationship between rotor and stator windings of pickoff 3 and 8 upon termination of the right turn maneuver, at which time contact 71a—b—c will be in the deenergized position as portrayed. Contact member 305 during inactive status of the signal insertion mechanism is normally neutrally disposed at the center of slope 310 of cam 319, a profile view of which is shown in greater detail in the adjacent inset. Upon clockwise displacement of cam 319, armature member 305 will engage the upper co-acting contact, providing connection to relay 70, which, upon deenergization of centering relay 69, will be energized through the 69c contact. Contacts 70a—b in the energized position will therefore permit motor 78 to run in the reverse direction by application of a current in the opposite sense to that previously applied, through the 71a—b—c contacts in the deenergized position, until such time when circuit discontinuity occurs by breaking the contacts of centering switch 80, thus stopping motor 78 and terminating the centering operation. Switch 79 is a limit switch which confines the operation of the motor within the arcuate limits imposed by the slopes 308 and 309, disposed peripherally on cam 319. The magnitude of the arc subtended by radial lines running through the slopes' midpoints will determine the limits of angular displacement of cam 319, and is an arbitrary design consideration. The rotor windings of pickoffs 3 and 8 being mechanically coupled with signal insertion mechanism 360 will be angularly displaced upon rotation of motor 78, and the alternating current E.M.F. induced in the respective stator windings thereof will therefore be a function of the sine of this angular displacement and the amount of excitation supplied from the rate potentiometers. The operation of signal insertion mechanism 360 as thus described in connection with a right turn command signal, is of course, fundamentally comparable to operation with the left hand turn command signal, in which cam 319 is displaced counterclockwise, inducing thereby E.M.F.'s in the stators of rudder and aileron pickoffs 3 and 8, respectively, that are opposite in phase compared with those previously.

The operation of signal insertion mechanisms 361 and 362, specifically associated with the pitch-climb, and the dive-level commands, respectively, is generally comparable to the operation of mechanism 360. The centering operation for the pitch and climb signal insertion mechanism 361 is identical to that of mechanism 360 except that the centering is performed during execution of a dive in response to a dive command signal. On the other hand, the dive and level signal insertion mechanism 362 embraces no automatic centering, but rather controls the rotation of the rotor of pickoff 15 directly in response to specific dive and level command signals.

Fig. 3c generally portrays the terminus of the instant remote control system including the electrical components and the hydraulic components responsive to the incoming electrical signals. Specifically, Fig. 3c shows an isolation step-down transformer 270 having a plurality of secondary windings for supplying excitation to trim control potentiometers 5, 11, and 17. The wipers of the potentiometers are disposed in the signal paths of the respective control axes to augment the respective voltages therein, and in this manner, slight manual adjustments in the datum attitude about the control axes of the aircraft may be made. A conventional electronic servo amplifier 204 is schematically represented in each of the rudder, elevator, and aileron signal paths. Servo amplifier 204 is of a push-pull type capable of converting the alternating current input signal into a proportional direct current voltage, for actuating the appropriate solenoid of transfer valve 127. The respective signals are applied to the inputs of the appropriate servo amplifiers 204 through the respective stator windings of follow-ups 7, 12, and 18.

The purpose of the follow-ups in accordance with the basic operating characteristics of the automatic pilot thus incorporated in the inventive remote control system is to control the amount of hydraulic servo stroke for a given control signal, and to return the aircraft control surface to its neutral position after the automatic pilot has made a correction in the aircraft attitude. The follow-up is essentially a transformer, like the pickoff, having a stationary stator winding and a rotor winding. The rotors 7A, 12A, and 18A are mechanically coupled to receive rotation proportional to a control surface displacement by means such as the exemplary ratchet and segmental gear arrangement 179. The rotor windings are electrically connected to receive excitation from sensitivity potentiometers 153, 163, and 164 which apply a fractionate voltage to the windings, controlling the excitation thereof, and regulating in effect the amount of servo stroke and system damping. The means for performing an automatic compensation of the rudder and elevator followup units 7 and 18 is embodied in the automatic elevator and rudder followup trim mechanisms 176 and 177, respectively, which are of similar construction. The mechanisms as portrayed fulfill the need for providing a substantially perpendicular relationship of the stator windings relative to the rotor windings of the respective followups, commensurate with aerodynamic requirements for appropriate followup trim in the vertical flight attitude. The elevator surfaces 218, for example, may in horizontal flight be disposed upwardly 1 or 2 degrees, and in a vertical dive these surfaces may be oppositely sloped 5 or 6 degrees in order to maintain the aircraft in a stable vertical dive attitude. As illustrated, therefore, switches 120 and 178 may be maintained closed during normal horizontal flight to provide connection to respective relays which initiate operation of the aforementioned mechanisms upon a keyed dive command. Although not portrayed in Fig. 3c, but subsequently discussed in connection with the detailed operation of electrical circuits of the instant invention is the provision of the landing trim means which utilizes the automatic rudder followup trim mechanism 177, when landing of the aircraft is involved.

Inasmuch as the automatic followup trim means are similar in construction and purpose, an exemplary discussion of the structure and operation thereof will be made in relation to the automatic elevator followup trim mechanism 176. Cam 166, a representative profile view of which is shown in the adjacent inset, is mechanically coupled to ratchet and segmental gear arrangement 179, which derives actuation from hydraulic servo 128 and co-acting cable 211 and thence to rotor 18A of followup 18. Thus, displacement of the elevator control surface will impart proportional rotation to cam 166 and rotor 18A. The stator winding 18B of followup 18 is in fact conventionally disposed concentrically of rotor 18A as a part of the followup housing, while the mechanical connection of stator winding 18B with motor 121 may comprise such conventional means as, for example, a worm drive gear, not illustrated in Fig. 3c. The purpose of cam 168 and centering switch 119 is to return the stator winding 18B to its normal position during horizontal flight, while the function of cam 166 and centering switch 120 is to provide a compensated setting of stator 18B, commensurate with the requisites of appropriate aerodynamic trim necessary for maintaining a vertical dive flight attitude. Relays 122 and 123 provide energization of D.C. motor 121. Limit switch 118 functions to restrict motor operation within the specific angular limits determined by the contour cam 168.

In the intrinsic operation of the automatic elevator followup trim mechanism 176, the centering switch 120 will normally be closed to furnish connection with either relay 122 or 123, except when neutrally disposed in a datum dive attitude. Upon receipt of a keyed dive command signal, contacts 10a and 91b will be closed to the energized position, providing connection with a 24 volt D.C. source, energizing relay 122 through the appropriate contacts of centering switch 120, as shown in the closed position, through the limit switch 118 to ground. Contacts 122a—b—c close to the energized position, supplying voltage to motor 121 through the deenergized 123a—b—c contacts to ground, causing motor 121 and stator 18B to rotate in such direction as to follow closely the displacement of rotor 18A. In Fig. 3c, this direction will be observed to be clockwise. A substantially perpendicular relationship is ultimately achieved between winding 18A and 18B in stable dynamic vertical flight, at which time contacts of centering switch 120 will be neutrally disposed, disrupting excitation of relay 122 and thereby motor 121. It will be observed that the activated contacts 91b prevent excitation of either relay 122 or 123 if the armature member of the normal centering switch 119 makes continuity with the lower co-acting contact at this time. Upon termination of the dive maneuver, contacts 10a and 91b return to the deenergized position and relay 122 drops out. However, relay 123 is now energized by virtue of the lower and armature member contacts of centering switch 119 being closed as the result of motor 121 having rotated as denoted above. Motor 121 now rotates in a counterclockwise direction by virtue of the application of excitation thereto in an opposite sense until centering switch 119 breaks circuit continuity, disrupting motor excitation and stopping rotation. The stator 18B thereupon assumes normal disposition for conventional horizontal flight.

The hydraulic system shown schematically in Fig. 3c is of conventional type and is herein illustrated by way of example to indicate the manner of actuating the primary control surfaces of the aircraft in response to suitable signals. It should be understood that this same system may also be used to furnish the high pressure oil required for actuating other hydraulically operated mechanisms of the aircraft, such as for example, the dive flap actuators, the throttle and brake mechanisms. In the hydraulic system shown in Fig. 3c, the engine pump 126 which may be of a constant displacement type requiring an unloader 209, imparts high pressure to the oil which is then taken through a regulator 134 and filter 136, and finally to an On-Off bleed valve 210, the paramount function of which is to expel air from the closed hydraulic system. The high pressure fluid will be observed to be admitted to transfer valve 127, which contains a tertiary set of solenoids selectively or collectively capable upon energization thereof to open apertures, permitting high pressure oil to flow to the appropriate hydraulic servo 128. The primary control surfaces, rudder, elevator, and ailerons, thus are subjected to displacement, according to the translation imparted by the respective hydraulic servos 128. The waste oil shown shaded is returned to a sump 143 for recirculation. High pressure outlet 260 is supplied for connection of other hydraulically operated mechanisms of the aircraft, as required.

Preliminary to a discussion of the overall operations of the instant remote control system, it is deemed apposite to describe the structure and operation of caging mechanisms 180 and 181 in connection with the detailed showing thereof in Figs. 4a and 4b. As previously denoted, the execution of turn or vertical dive maneuvers dictates the automatic caging or uncaging of appropriate gyroscopes in accordance with inventive design principles. Inasmuch as the caging mechanisms as applied to either the dive or directional gyroscopes, are of similar construction, the exemplary discussion herein will be with reference to the directional gyroscope caging mechanism 181. Thus, in Fig. 4a is shown a cylindrical drum 320, having a generally triangular aperture 321. The lower apex as shown, subtends an angle of approximately 60°, permitting a freedom in yaw of about plus or minus 30°. An aperture engaging support rod 327 is disposed for lateral translation, as indicated by the arrows, within the angular limits set above and also in a direction perpendicular to this translation as shown by the arrows in the view of Fig. 4b. A conventional caging arm 322 of the gyroscope has fitted thereon an adapting yoke 323. A bolt 324 extending through the free end of caging arm 322 and adapting yoke 323 holds caging cam 325, which is so shaped that it readily engages with pin 326 and prevents any motion of the inner gimbals with respect to the outer gimbals of directional gyroscope 206. Caging cam 325 is a conventional cam member normally supplied as a part of the manual caging assembly of the directional gyroscope of an automatic pilot of the type previously noted, for enabling manual caging thereof. A reversible direct current motor 76 imparts direct rotation to the cylindrical drum 320 through the aid of suitably interposed gears in response to energization of either of relays 72 or 73, as illustrated in Fig. 3a, operable to effect rotation of the motor 76. Switch 77 is a limit switch effective to terminate rotation upon completion of the engagement or disengagement of pin 326 with caging cam 325. The cam 331 may comprise an adjustable superimposed pair of raised sectors 329 and 330. Slots and tightening bolts (not shown) may serve to hold the cam sectors 329 and 330 in adjustably fixed position with respect to one another, and in relative position with the drum 320. Fig. 4b portrays an exposed end portion 328 of the drum which provides the support for the cam sectors. Switch 77 is maintained closed as indicated in Fig. 4b so long as the armature member of this switch is disposed to ride on an arcuate surface of constant radius. At the arcuate extremities of this surface on cam 329 are slopes having opposing inclinations which are effective to thus break either contact of switch 77 with the armature contact member, as appropriate.

The operation of the directional gyroscope caging mechanism can best be seen with reference to the combined showing thereof in Fig. 3a and Figs. 4a and 4b. The caging mechanism in Figs. 4a and 4b is portrayed in the caged position, the engaging pin support rod 327 resting in the lower apex of the triangular aperture 321. The force necessary for forceable engagement or disengagement of caging cam 325 and caging pin 326 is derived from the torque imparted to the cylindrical drum 320 by motor 76. Assuming that the mechanism is uncaged, the triangular aperture will have rotated so that the side opposite the lower apex will be adjacent rod 327, which is disposed in this position of cylindrical drum 320 for unrestricted lateral movement in the widest portion of the aperture within the imposed plus or minus 30° angular limits. Caging cam 325 will of course have been disengaged concurrently from caging pin 326. Upon receipt of a turn signal, contact 2b will be closed to the energized position providing connection with a 24 volt D.C. source to relay 72 shown in Fig. 3a, through the appropriately closed contacts of switch 77 to ground. Contacts 72a—b—c shown in Fig. 5 and elsewhere in the detail drawing provide for excitation of motor 76, which begins to turn. If rod 327 is asymmetrically disposed within the aperture, it will travel laterally as indicated by the arrows in Fig. 4a in sliding contact engagement with a triangular edge of the aperture of drum 320 until the rod is centered at the lower apex. The above operation will realign the spin axis of the directional gyroscope coincident with the lateral axis of the aircraft, or with a predetermined compass course as would be performed in manual caging. Concurrently with the arrival of engaging pin support rod 327 at the lower apex of the aperture 321, caging cam 325 is forcibly engaged with caging pin 326 by application of a force transmitted clockwise of the device as shown in Fig. 4b to rod 327 at the point of the lower apex, and in addition, the armature member of limit switch 77 begins to rise along the end slope of cam 330, breaking contact and deenergizing relay 72, which removes excitation from motor 76, stopping rotation. Thus, the cycle is completed and the directional gyroscope 206 is now caged. For uncaging, contacts 2b are in deenergized position to supply excitation for relay 73 through the closed set of contacts of switch 77 to ground. The latter contacts remained closed upon termination of the caging cycle. Contacts 73a—b—c shown in Fig. 5 and elsewhere in the detailed drawings provide connection to a 24 volt source having in this instance a polarity opposite to that previously applied to motor 76, which now turns in the opposite direction until such time when the common contact member of switch 77 comes in proximity with the depressed end slope of cam 329, breaking the circuit continuity of relay 73 and stopping rotation of the motor. Momentarily prior to termination of motor rotation, the side opposite the apex of the triangular aperture 321 transmits a force to rod 327 counterclockwise of the device as shown in Fig. 4b positively effecting disengagement of caging cam 325 from caging pin 326. Thus, the uncaging cycle is now completed and the directional gyroscope 206 is now properly uncaged.

*General operation of the remote control system*

The basic composite showing of the inventor's remote control system in Figs. 3a, 3b and 3c, permits only a general treatment of the operation of the overall system. Thus, the description of the system operation in relation to these figures will be made in general terms with regard to conventional normal flight during which time the aircraft is subject to the distinctive prevailing control of the embodied automatic pilot, and with respect to the execution of turn, climb, pitch, dive, level and post pullout command signals in that order. A detailed consideration of the electrical circuits including the relay logic pertinent to the execution of these commands will be given below in connection with other more detailed figures in the drawings.

It is to be noted that in horizontal flight of the pilotless aircraft, the basic automatic pilot incorporated in the instant invention and portrayed in the composite showing comprising Figs. 3a, 3b, and 3c performs its specifically assigned task of maintaining the aircraft's datum attitude. Under these operational conditions, the automatic pilot corrects for incremental deviations in yaw, pitch, and roll about the respective control axes of their aircraft. Signal E.M.F.'s proportional to the deviations from the control axes are electro-magnetically induced in the stators of pick-offs 1, 9, 13, and 14, since a null or perpendicular relationship between rotor and stator windings thereof fails momentarily to exist, in accordance with basic operation of an automatic pilot. These signal E.M.F.'s with the exception of the signal E.M.F. of the dive aileron pickoff 13, which has no application in conventional flight, are applied through appropriate windings of the signal insertion mechanisms 360, 361 and 362, as denoted by the single, double, and triple arrowhead notation employed to facilitate tracing of the elevator, aileron, and rudder signal voltages, respectively. In non-operative status of the signal insertion mechanisms, a null relationship exists between rotor and stator windings of the inductive pickoffs 3, 8, 15, and 16, and the voltage contributions respectively introduced into the principal signal paths by the inductive pickoffs may be considered zero. Thus, the role of the signal insertion mechanisms in the non-operative status is static in character, asserting no influence whatever on the signal E.M.F.'s normally derived in connection with the prevailing dynamic corrective action of the automatic pilot in horizontal flight. The signal voltages proportional to the incremental deviations about the control axis of the aircraft will be observed to be applied to trim potentiometers 5, 11, and 17, associated with the rudder, aileron, and elevator signal paths, respectively. Since the alternating current voltages at the fixed centers of the potentiometers are neutrally disposed relative to the applied voltages supplied from the secondary windings of stepdown isolation transformer 270, any displacement of the wiper contacts from the neutral centers will effectively augment the existing signal voltages in series therewith, both as to amplitude and phase. The trim potentiometers 5, 11, and 17 function, therefore, to introduce an adjustable differential voltage for purpose of changing the angular relation between rotors of the pickoff and the followup devices, respectively, thereby serving to effect small changes in the course, or the datum attitude of an aircraft. The signal voltages existing in the rudder, aileron, and elevator signal paths, at this point, are applied to the respective servo amplifiers 204 through the respectively associated stator followup windings 7B, 12B and 18B. It is to be noted that the voltages electro-magnetically induced into the latter windings are in phase opposition to the signal E.M.F.'s derived from the displacement of the gyroscopes, and insofar as a particular servo amplifier 204 is concerned, it sees as an input signal, the algebraic summation of all series introduced alternating current signal voltages taken from ground as a zero reference. The servo amplifier of conventional type is continuously responsive to convert this A.C. signal into a proportional push-pull differential output current for actuating the pertinent solenoid of transfer valve 127. Thus, as the servo piston rod of a particular hydraulic servo 128 moves back and forth in response to actuation of transfer valve 127, the ratchet and segmental gear assembly 179 will impart rotation to the rotor of the followup. Rotation of the followup rotor concurrently changes the size and direction of the voltage produced in its stator. Because of the nature of the circuit, the voltage is always opposite in polarity to the gyroscope signal voltage that causes the hydraulic servo to move; therefore, it tends to stop further motion of the servo. As the automatic pilot makes a correction in the airplane's attitude, the original gyroscope signal voltage is reduced and becomes smaller than the followup voltage. This action reverses the net signal and causes the control surface to return to its normal position. Therefore, in normal flight the automatic pilot, as denoted above, performs its specifically assigned task of maintaining the pilotless aircraft about a datum attitude.

With respect to the general presentation of the inventive remote control system in Figs. 3a, 3b and 3c, the implementation of the right turn commences with energization of relays 66 and 67, in reponse to a keyed right turn radio command signal selectively received by the joint operation of receiver 200 and selector 200A. Assuming the aircraft is in horizontal flight under control of the automatic pilot, the directional gyroscope caging mechanism 181 will begin its cycle to cage directional gyroscope 206 upon transfer of contact 2b to the energized position. Simultaneously, the 2c contact effect substitution of dummy load 19 for the stator winding of pickoff 1, thus insuring an equivalent impedance of zero voltage characteristics to be inserted into the rudder signal path. Signal insertion mechanism 360 becomes operative in a manner as previously set forth, and motor 78 rotates, inducing an E.M.F. into the stators of the rudder and the aileron pick-offs 3 and 8, respectively. The amount of rotation and therefore the magnitude of the induced A.C. signal E.M.F. is a function of the length of keying time, the maximum rotation being within the operational limits imposed by the relative disposition of slopes 308 and 310 on cam 319. Thus, the signal E.M.F.'s as generated are impressed upon the respective servo amplifier 204 of the rudder and aileron signal channels, the respective outputs thereof serving to energize the rudder and aileron solenoids of transfer valve 127. The appropriate hydraulic servos of the aircraft are thereupon responsive to effect displacement of the rudder and aileron, the amount of displacement being proportional to the rotation produced by motor 78. The rotors 7A and 12A of followups 7 and 12, respectively, in accordance with basic operating characteristics thereof will assume a position such that the voltages electro-magnetically induced therein will precisely cancel the respective voltages generated in the rudder pickoff 3 and aileron pickoff 8. Therefore, the input voltage impressed on servo amplifier 204 becomes zero, after stabilization of the aerodynamic and electrical servo loop operation is achieved, and the rudder and aileron surfaces will be maintained displaced to effect orbiting of the aircraft at a bank angle commensurate with the turning radius of the aircraft.

With particular respect to imparting an initial coordinated displacement of the aileron control surfaces 219 during the execution of a turn, a diversity in combined aerodynamic and electrical servo loop operation exists inasmuch as a notable structural disparity is evidenced between the two signal channels. Of special significance, it is to be noted that while the parallel impedance or dummy load 19 statically provides a zero voltage contribution in the rudder signal channel, the aileron pickoff 9 due to direct displacement in roll as the pilotless aircraft executes a bank, develops a finite signal voltage. The distinctive operation exhibited in the first instance is significant to effect orbiting by maintaining constant displacement of the rudder. In the second instance, the aileron control surfaces 219 are given an initial displacement which is coordinated with the turning radius of the aircraft, and thereupon the aileron surfaces are returned to neutral; otherwise, the aircraft would corkscrew or rotate about its longitudinal axis. Thus, with respect to the combined aerodynamic and electrical servo operation of the aileron signal channel, the signal voltage electromagnetically introduced into the stator of pickoff 8 and modified by the differential voltage of the aileron trim potentiometer 11, is impressed on the input circuit of servo amplifier 204 of the elevator channel, the contribution of the stator 12B of followup 12 at this time being essentially zero. As the servo amplifier develops an output voltage, the appropriate solenoid of transfer valve 127 is actuated and the hydraulic system controlling the aileron control surfaces 219 effect a displacement thereof, concurrently turning the rotor 12A. A voltage equal in magnitude and of opposite phase is developed in the stator of followup 12, which nullifies the original signal of pickoff 8 and the aileron surface begins to return to the normally neutrally disposed position. As the aircraft responds to the initial displacement of the aileron control surfaces, a basic operational transition is manifested in that the origin of the voltage effectual to cancel the signal voltage of pickoff 8 is now obtained from the stator winding of pickoff 9. Thus, after stabilization of the combined aerodynamic and electrical servo loop operation with regard to the aileron signal channel, the signal voltage of pickoff 9 derived from misalignment with the coordinate control axis as established by gyroscope 207 will be substantially equal and opposite in phase with the voltage electromagnetically induced in stator winding of pickoff 8. Therefore, the aircraft maintains a predetermined coordinate degree of bank angle in the performance of turns.

In order to reestablish horizontal flight, the inventive remote control system provides initially for removing the A.C. signal introduced into the rudder and aileron signal paths. This is accomplished by keying both the right and left turn commands. In operational effect, the result is tantamount to a nullification of command signals, since the pilotless aircraft proceeds to return to horizontal flight. This particular operation relates directly to the centering function as performed by motor 78 which rotates in this instance to return the signal insertion mechanism to the normal quiescent position. Specifically, the binary keying as denoted disrupts the holding voltage of relay 69 so that contact 69c as shown in deenergized position in Fig. 3b will now provide excitation of relay 70 through the centering switch 80. Substantially concurrent with the termination of the centering operation, the aircraft is reestablished in horizontal flight, and the coincident release of the keying of both turn command signals at this time effects transfer of contacts 2c and 2b to the normal deenergized positions, uncaging the directional gyroscope and reestablishing the latter's functional role.

It should be noted that the inclined bank and climb gyroscope 207 provided in the instant invention in lieu of the normally vertically disposed bank and climb gyroscope of a conventional autopilot functions in the conventional manner to initiate corrective action to maintain the proper attitude of the aircraft about its pitch axis, not only in substantially level flight but also during the execution of right and left turns.

The pitch and climb signal insertion mechanism 361 becomes operative upon direct excitation of either relay 81 or 82 in response to climb or pitch command signals, respectively. Assuming a climb command has been remotely keyed while the aircraft is in horizontal flight, relay 81 will be energized, contacts 81a—b thereupon providing connection of a 24 volt D.C. source to motor 84 through the quiescently disposed contacts 82a—b to ground, as indicated in Fig. 3b. Motor 84 thus begins rotation to effect counterclockwise turning of cam 363, as shown in Fig. 3b and continues to rotate, as a function of the duration of keying command time which determines the relative angular relationship between the rotor and stator windings of elevator pickoff 16, and therefore, the magnitude of the induced signal E.M.F. effective to initiate the desired degree of climb. The voltage contribution of elevator pickoff 16 is algebraically added in series with the interconnected rotor winding of pickoff 15, which electromagnetically receives the incremental voltage of pickoff 14 in direct proportion to the incremental deviations of the aircraft about its lateral or pitch control axis. An angle of climb will subsequently be assumed by the aircraft by virtue of the initial positive displacement imparted the elevator control surfaces 218, such that upon stabilization of the combined aerodynamic and electrical servo loop operation involved, the voltage of inductive pickoff 14 as translated to the inductive pickoff 15, will be exactly equal and in phase opposition to the signal E.M.F. electro-magnetically induced in the stator winding of elevator pickoffs 16. In this respect, the operation as denoted for a climb is basically similar to that for the aileron channel described above. Thus, the input voltage to amplifier 204 of the elevator signal channel will be zero after the system operation has stabilized, and the elevator control surfaces 218 and co-acting rotor 18A of followup 18 will be disposed in a neutral position during normal climb attitude of the aircraft.

The pertinent aspects of the combined aerodynamic and electrical servo loop operation instrumental to effect a climb attitude of the aircraft as denoted above may best be elucidated in greater particularity beginning from a horizontal flight attitude of the aircraft, in which instance the normal automatic pilot operation prevails in the system. Upon keying climb, the signal E.M.F. induced in the stator of pickoff 16 is momentarily the dominant signal of significant proportion appearing in the input circuit of amplifier 204 of the elevator signal channel. The elevator solenoid of transfer valve 127 initiates operation of the hydraulic system which imparts displacement of the elevator surfaces 218, and concurrently with it, the rotation of rotor 18A of followup 18 in which is developed a voltage equal and opposite to the signal voltage that causes the action to take place. The aircraft thereupon responds in flight by assuming a climb attitude, during which time a concomitant displacement of the rotor of pickoff 14 has taken place. A basic operational transition is manifested in that the voltage instrumental to cancel the signal voltage of the elevator pickoff 16 is now derived from direct displacement of the rotor of pickoff 14 translated to the rotor of pickoff 15 which functions in this particular instance in the manner of a conventional transformer, since no rotation thereof is incurred at this time. The voltage of followup 18 is reduced to zero, and coincidently the elevator control surfaces 218 are returned to their neutral position. Therefore, upon stabilization of the combined aerodynamic and electrical servo loop operation as set forth above, the signal E.M.F. of the elevator pickoff 16 is equal and in phase opposition with the voltage of the rotor of pickoff 15, as derived from the displacement of the rotor of pickoff 14. The aircraft is thus maintained in the climb attitude until such time when the pitch command signal is remotely keyed. It is to be noted that the maximum angle of permissible climb is determined by the configuration given cam 363 in accordance with consideration of the aerodynamic system capabilities of the aircraft. Thus, the sustained keying of the climb command signal will influence signal insertion mechanism 361 to the extent that the stator of pickoff 16 will have induced therein a maximum signal E.M.F. at which point in the intrinsic operation of the signal insertion mechanism 361, motor 84 stops rotating due to the opening of the upper contact of limit switch 86, disrupting thereby the ground return for delay 81.

The signal insertion mechanism 361 is responsive when a pitch command signal is keyed to effect rotation of motor 84 in a direction opposite to that required for a climb. Relay 82 is energized as shown in Fig. 3b through the contacts of limit switch 86 to ground upon receipt of a pitch command signal. Assuming the pilotless aircraft is in a climb attitude, the excitation for motor 84 is now applied in an opposite sense, through the 82a—b contacts in energized position and the 81a—b contacts in deenergized position, to ground. Motor 84 rotates in a direction to approach a null or perpendicular relationship between rotor and stator windings of the elevator pickoff 16, thus effecting the removal of the signal voltage originally introduced to initiate climb of the aircraft. The rotor of pickoff 16 will continue to rotate commensurate with the duration of keying, and consequently, the aircraft may be directed into a glide attitude having, within prescribed operational limits, an angle of descent in flight that is proportional to keying time. Alternatively, the aircraft may simply be returned to a horizontal flight attitude. Inasmuch as the centering function associated with signal insertion mechanism 361 is rendered inactive with contact 83b in its normally deenergized position as shown in Fig. 3b during operation of either of the circuits of the climb or pitch command signals, return of the aircraft to a substantially horizontal flight attitude is achieved in direct response to selective keying of the pitch and climb command signals. It should be understood that the combined aerodynamic and electrical servo loop operation responsive to a pitch command signal does not fundamentally differ from that responsive to a climb command signal, differing only to the extent that the signal voltages associated with each of these commands are of opposite phase, with all other facets of operation being substantially the same.

With respect to the general composite showing of the inventive remote control system in Fig. 3a, Figs. 3b and 3c, the keying of a dive command signal is effective to energize relays 83 and 88 through the closed contact of limit switch 94, to ground. Relay 88 actuates the dive and level signal insertion mechanism 362 by providing excitation for motor 95 through the 88a—b—c contacts, in energized position, and the 89a—b contacts, in deenergized position, as shown in Fig. 3b, to ground. Motor 95 continues to rotate until keying of the dive command signal is either terminated or limit switch 94 co-acting with cam 364 disrupts the excitation circuit of relay 88. Cam 364 may thus function to effect a pre-set dive angle to the aircraft, the illustrative showing of the cam profile in the adjacent inset being representative of the typical contour necessary to effect a vertical dive, and subsequent pullout therefrom to level flight. Thus, cam 364 will turn counterclockwise from its quiescent position as shown in Fig. 3b, and the rotor of the two-phase pickoff 15 will be angularly displaced from its null position so that the signal E.M.F. effective to implement a vertical dive is introduced into the elevator signal path. In order to assure that the magnitude of this signal voltage at all times corresponds to the angle of dive of the aircraft in flight, centering operation of signal insertion mechanism 361 is also actuated upon receipt of a dive command signal, contact 83b closing to the energized position to provide in this excitation to centering switch 85. Thus, concurrently with the introduction of a dive signal E.M.F. into the rotor of pickoff 15, any residual voltage in the stator of pickoff 16 is nulled out by insuring perpendicularity between windings thereof. Consequently, the signal voltage contribution of pickoff 16 will necessarily be zero and in effect the aircraft always commences the vertical dive from the same reference, which logically may be chosen as horizontal flight.

In addition to the energization of the aforesaid signal insertion means in response to a dive command signal, the instant remote control system in accordance with fundamental inventive principles thereof provides for uncaging of dive gyroscope 208 by closing of contact 10c to the energized position, thus supplying excitation for relay 97 through the closed contacts of limit switch 99, to ground. Caging mechanism 180 thereupon is actuated to permit aileron or roll information to be originated with gyroscope 208, the stator of inductive pickoff 13 having electromagnetically induced therein a voltage proportional to the deviation of the aircraft about its longitudinal control axis, which in vertical dive attitude is aligned substantially coincident with a normal to the earth surface. This signal voltage is now used in lieu of the signal voltage of pickoff 9, the transfer of the roll information of pickoff 13 being made through the closed 10b contact, which is in energized position during dive. An algebraic summation of the signal voltages of the aileron signal channel with respect to ground as the zero reference is made in the usual sense, the voltage contribution of aileron pickoff 8 being zero, as is understood, in the quiescent state of the turn signal insertion mechanism 360. Thus, the respective servo amplifier 204 of the aileron signal path is impressed a signal governed by gyroscope 208 proportional to the roll of the aircraft in a vertical dive flight attitude, and the hydraulic system which actuates the aileron control surfaces 219 is responsive to correct for the incremental deviations in roll in the usual manner, characteristic of automatic pilot operation.

The keying of a dive command signal provides in addition to the energization of the electro-mechanical means thus far specified, the actuation of the automatic elevator and rudder followup trim mechanisms 176 and 177, respectively, the operation of which has been previously set forth in connection with Fig. 3c. Contacts 10a, 91a, 91b, and 91c are in energized position to initiate operation of these mechanisms, which thus compensate for error arising from the inherent change of the control surface position with the change in air speed resulting from assumption of a dive attitude. Therefore, the automatic rudder and automatic followup trim mechanisms in accordance with aerodynamic requirements for a particular aircraft are designed to maintain the airplane in a straight vertical dive attitude as its velocity increases during the dive. In addition to the above operations as enumerated with respect to Figs. 3a, 3b, 3c, the following operations, which are discussed with greater particularity in relation to the detailed electrical circuits relative thereto, also occur when a dive command is keyed: the throttle is set to the dive position. The elevator and rudder trim tabs run to high Mach number positions which have been pre-set. The dive recovery flap circuit is armed, in preparation to function if the aircraft has not responded to pullout from the vertical dive after a predetermined time interval.

The combined aerodynamic and electrical servo loop operation which is involved in implementing stabilized substantially vertical flight is comparable with the operation incurred for either the climb or pitch commands. The provision for deenergizing relay 88 by the joint action of pre-set cam 364 and limit switch 94 in response to a sustained keying of a dive command signal insures the electro-magnetic induction of a signal E.M.F. into the rotor of the dive and level pickoff 15, the magnitude of which is in exact proportion to that required for performing a substantially vertical dive. The signal E.M.F. as thus introduced into the elevator signal path by the predetermined angular displacement of the rotor of pickoff 15 is momentarily the dominant signal E.M.F. appearing at the input of servo amplifier 204 of the elevator signal channel, the incremental voltage present in the circuit and developed in direct response to the normal incremental deviations manifested during characteristic automatic pilot operation being negligible during this interval. Amplifier 204 of the elevator signal channel is thereupon responsive to actuate the pertinent solenoid of transfer valve 127, bringing into conventional operation the airplane's hydraulic system, effective to depress the elevator control surfaces 218. The concomitant angular displacement of rotor 7A of followup 7 produces a voltage therein that is exactly equal and opposite in phase to the signal voltage of pickoff 15, whereupon the output of the amplifier 204 becomes zero, and the elevator control surfaces 218 return to neutral. In substantial concurrence with the above dynamic operation, the initial displacement imparted to control surfaces 218 causes the aircraft to proceed into a vertical dive attitude. A transitional phase of fundamental character similar to that of the elevator and aileron signal channels occurs during this interval in that as the followup voltage serving to cancel the signal E.M.F. of the rotor of pickoff 15 is being gradually reduced, the induced signal voltage proportional to the angular displacement of the rotor of elevator 14 is gradually increasing until at stabilized vertical flight, the signal voltage of pickoff 14 is equal and opposite in phase with the induced signal E.M.F. of pickoff 15. Therefore, upon stabilization of the combined aerodynamic and electrical servo loop operation, the signal voltage introduced by the predetermined angular displacement of the rotor of pickoff 15 will be exactly canceled or nulled out by the angular displacement of the rotor of pickoff 14, and the elevator control surfaces 218 are returned to and maintained in a neutral position, as necessary for a vertical dive flight attitude.

The remote keying of a level command is instrumental in effecting pullout of the aircraft from the vertical dive. Or, automatic pullout may be elected by embodying an altitude limit switch 90 schematically shown in Fig. 7. Relay 89 in Fig. 3b will be energized in response to either altitude limit switch 90 or a level command signal. A ground return is provided through the lower set of contacts of switch 94, rendered quiescently disposed on the slope 365 of cam 364 by virtue of anterior keying of a dive command signal having only the requisite that the duration thereof was sufficient to insure limit operation of motor 95. The energization of relay 89 with respect to the dive and level signal insertion mechanism 362, therefore, will provide excitation for motor 95 through the activated 89a—b contacts such that it rotates in the clockwise direction as shown in Fig. 3b to return the rotor of pickoff 15 to the null position portrayed in Fig. 3b, thereby removing the original signal E.M.F. effective to initiate implementation of the vertical dive. Motor 95 completes its motor circuit in this instance through the closed 88a—b—c contacts shown in deactivated position. As in the limit operation in connection with the dive command signal, motor 95 rotates as a function of the duration of the keyed level command, until such time when the slope 366 of cam 364 coacting with the common contact of switch 94 breaks the lower set of contacts thereof, interrupting circuit continuity of relay 89 and thereby allowing motor 95 to stop in the normal non-operative position, as shown. In addition to the actuation of motor 95, the level command signal is effective to interrupt the excitation of the automatic elevator followup trim mechanism 176 by opening the circuit supplying excitation to the followup centering switch 120. It should be understood that the combined aerodynamic and electrical servo loop operation as involved for reestablishing level flight in response to a remotely keyed command signal is fundamentally comparable with the operation as relating to the execution of a dive command signal.

The post pullout command signal culminates the dive and level operations by returning the circuits pertinent thereto and which are still maintained energized to the normal quiescent state wherein the pilotless aircraft is subject to the prevailing control of the incorporated automatic pilot. Thus, with respect to the general composite showing in Figs. 3a, 3b, and 3c keying of a post pullout command signal energizes the post pullout relay 92, which effects return of contacts 10b and 10c to the normal deenergized position, thereby providing for roll or aileron information to be originated with the inclined bank and climb gyroscope 207 and effecting caging of the dive gyroscope 208. In addition, the automatic elevator and rudder followup trim mechanisms 176 and 177, respectively, revert to the normal status for conventional flight. The contacts 10a, 91a, 91b, and 91c are deenergized and assume the deactivated positions as shown. Thus, the automatic followup trim mechanism in accordance with operational and structural details as previously set forth are rendered operative in the opposite direction by contacts 91a and 91b in deenergized position so that stators 7B and 18B of followup 7 and 18, respectively, are rotated to their normal positions relative to their respectively associated rotors. When the post pullout command signal has restored the elements of the remote control system to a normal quiescent status, the pilotless aircraft assumes a level flight attitude, subject to the conventional prevailing control of the automatic pilot incorporated in the instant remote control system.

*Detailed analysis of the electrical circuits*

Fig. 5 depicts in greater particularity the electrical circuit elements necessary for developing a rudder signal with a portion of the aileron signal channel also indicated for the purpose of illustrating operations which are performed in common. Both the aileron and rudder signal voltages are shown with arrowhead notations corresponding to those in Fig. 3 to facilitate tracing of the respective signal paths, which are co-extensive with the signal channels shown in the composite illustration therein. The origin of the rudder signal is pickoff 1, which is shown in mechanical coupling relation with gyroscope 206, herein indicated to contain a conventional three phase synchronous motor 182 for driving the gyroscope rotor about the spin axis thereof. Excitation for this motor is supplied from a suitable three phase source with connections as noted. The rudder signal proceeds through the contact 2c of the caging transfer relay 2 quiescently disposed, rudder pickoff 3 of the turn signal insertion mechanism, contact 4c of the brake transfer relay, contacts 160c and 161c of the left and right relays, respectively, rudder trim potentiometer 5 and finally, to contact 4b, where the rudder signal emerges and progresses to the rudder servo amplifier 204, illustrated in Fig. 3c. The aileron signal is illustrated as coming from contact 10b of the dive transfer relay 10, and progresses through pickoff 8 which is portrayed in common mechanical coupling relation with pickoff 3, both pickoffs are mechanically driven by motor 78, as illustrated. The aileron signal after being augmented by the differential voltage of trim potentiometer 11 subsequently proceeds to the aileron servo amplifier 204 shown in Fig. 3c. Thus, the detailed circuit path embracing each of these signals is mutually co-extensive with the composite showing of the instant remote control system illustrated in Fig. 3. The excitation for trim potentiometer 5 and 11 is obtained from step-down transformer 270A and 270B, electrically a part of transformer 270 shown in Fig. 3c.

Apart from the above alternating current signals instrumental to directly influence the attitude of the aircraft, two other distinctive voltages are present in the portion of the remote control system shown in Fig. 5, namely, the voltages derived in response to keyed command signals and which are effective to energize the relays shown in Fig. 2, and a 24 volt direct current source, which is termed a Z voltage, having only the special connotation that this voltage is interlocked and consequently rendered available only when all components of the aircraft are in electrical interconnection. This provision, therefore, serves as a precautionary measure to insure reliability of operation.

With respect to the implementation of a right turn in response to a radio command signal, relays 66 and 67 as illustrated in Figs. 2 and 5 are energized, and the following specific operations are performed: The centering relay 69 is actuated through the activated 66a contact and deactivated 68b contact of the quiescently disposed left turn relay 68, to the Z voltage source. Holding action is immediately initiated with relay 69 through its own 69a contact, and through the deactivated 68c contact and, when keying is terminated, through 67a contact in parallel with the 68c contact, to the Z voltage source. Thus, the contact 69c will be observed in energized position to remove the normal centering excitation for the left relay 70 when keying a right turn. The right relay 71 is energized through contacts 66c, 68a, to the Z bus, the ground for relay 71 being completed through limit switch 79, whereupon 71a—b—c contacts provide excitation for motor 78 through the deactivated 70a—b contacts, and the motor rotates. Contact 67a now in activated position energizes caging transfer relay 2, through the contact 75c of the brake uncaging relay 75, the holding voltage for relay 2 being applied through its 2a contact, 75b, and 69b now in activated position. Contact 2c effects connection to dummy load 19. Contact 2b furnishes excitation for caging relay 72 through limit switch 77 to ground, contacts 72a—b—c in energized position thereupon supply the excitation for caging motor 76 through the deenergized 73a—b—c contacts, to ground. In summary, the excitation of relays 66 and 67 in response to a right turn command signal causes the following relays to be energized: Centering relay 69, right relay 71 which provides excitation to motor 78, and caging transfer relay 2. In particular, contact 69a provides for the holding of its own relay 69, 69b furnishes holding for caging transfer relay 2, and 69c interrupts excitation to the left relay 70 at this time. In addition, 2a provides holding for its own relay 2, 2b energizes caging relay 72 through switch 77, and 2c substitutes the dummy load 19 for the stator of pickoff 1. Thus, operation of the circuit elements as herein denoted is initiated. Motor 78 continues to turn until either the keying is terminated or limit operation is incurred with switch 79. The caging cycle, however, progresses to completion irrespective of keying command time, since the caging transfer relay 2 is maintained energized by holding voltage provided from 69b which is in activated position. Centering relay 69 is maintained energized by the holding voltage supplied through either 68c, or the paralleled combination 67a and 68c when keying of the right turn command signal is terminated. Therefore, upon termination of keying, or the deenergization of relays 66 and 67 by limit operation, the aircraft will continue to orbit with a turning radius and coordinated pre-set bank angle as determined by the setting last established by motor 78.

In order to return the aircraft to substantially horizontal flight, it is but necessary to key both right and left turn command signals simultaneously. This binary keying operation actuates relay 68 in addition to relays 66 and 67, and is effective in this instance to interrupt the holding voltage supplied to centering relay 69 by breaking both contacts 67a and 68c. Therefore, relay 69 is deenergized and its 69c contact is now effective to initiate the centering operation. Its 69b contact would normally cause caging relay 2 to drop out. However, caging transfer relay 2 is maintained energized during the binary keying of commands, since only a transfer of excitation voltage takes place: The Z voltage as obtained through the 67a and 68c contacts in activated position is mutually applied through contact 75c of the brake uncaging relay 75, and thus to relay 2. Upon elapse of a predetermined time interval, the centering operation will be completed, and the uncaging of gyroscope 206 may now be initiated by coincident termination of the binary keying operation. Therefore, as relays 66, 67, and 68 revert to a normal status in the absence of keyed command signals, caging transfer relay 2 drops out. Thus, contact 2b will be seen to effect excitation of uncaging relay 73, the 73a—b—c contacts thereof provide in this instance connection of a Z voltage source to caging motor 76 in a polarity sense to reverse or uncage the directional caging mechanism 181. Contact 2c is thus effective to uncage gyroscope 206. It will be observed that the 69c contact in deenergized position supplied the necessary excitation for performing the centering operation with motor 78 through the centering switch 80 of the turn signal insertion mechanism 360. Therefore, the rotors of pickoffs 3 and 8 are returned to a null or perpendicular relationship relative to their respective stator windings. The aircraft is now returned to substantially horizontal flight under the prevailing control of the automatic pilot.

The singular keying of the left turn signal is also effective to return the pilotless aircraft toward substantially level flight, assuming the airplane to have been orbiting in right circles as denoted above. During singular keying centering relay 69 is maintained energized by the holding voltage supplied through the 67a contact in deactivated position, and therefore, return of the aircraft toward substantially horizontal flight is performed under continuous direct operator control. Sustained singular keying of a left turn command will ultimately cause the aircraft to orbit to the left in circles of constant radius at a predetermined degree of bank angle. The reversal of motor 78 is accomplished by excitation of left relay 70, the excitation path therefor being from the Z voltage bus, through the activated contact 68a, deactivated contact 66b, relay 70, limit switch 79, to ground. Contact 68b in energized position normally provides relay voltage for initial actuation of relay 69 through the deenergized contact 66a, a holding action thereafter being performed in the usual manner for this relay through its 69a contact and 67a in deactivated position. Contact 68c in energized position provides excitation of caging transfer relay 2 through the brake uncaging contact 75c, a holding action thereafter being performed for relay 2 through 75b to the 69b contact in energized position. As in the case of a right turn, the aircraft is returned to horizontal flight subject to the distinctive prevailing control of the automatic pilot by performing simultaneous keying of both the right and left turn command signals to drop out centering relay 69, and thereupon coincidently terminating the binary keying operation to drop out the caging transfer relay 2.

The climb and pitch relays 81 and 82, are illustrated in Fig. 6 as well as in Fig. 2 as deriving their actuation from frequency selector 209A, and the relays are each selectively operable to alternately control reciprocal rotation of motor 84 in a manner as illustrated and described in connection with Fig. 3b. Briefly, relays 81 and 82 are selectively actuated through limit switch 86 to ground, in response to climb and pitch command signals, respectively. The contacts 81a—b or 82a—b, in energized position provide connection to a Z voltage bus for driving motor 84, the ground return being completed through the deenergized set of contacts. The relays' contacts are mutually interlocked so that a simultaneous keying of these commands has no function, producing no rotation of motor 84. The schematic circuit of Fig. 6 also indicates in greater particularity the connection employed to supply an elevator followup trim voltage to the followup centering switch 120 illustrated in Fig. 3c, wherein this connection is shown in a considerably abbreviated form for sake of simplicity. The common contact of the switch 120 in actuality is connected with a Z voltage source through the 10a contact in activated position of dive transfer relay 10, only if 89c of level relay 89, 81c of the climb relay 81, 82c of the pitch relay 82, and 83c of the dive relay 83, are all in deenergized status to provide continuity, as illustrated in Fig. 6. The special interlocking of the denoted contacts insures that the automatic elevator followup trim centering voltage is supplied only during the execution of a vertical dive, contact 83c being rendered closed as portrayed by virtue of limit operation of switch 94, illustrated in Fig. 3b. A centering voltage for the centering switch 85 is supplied from either 83b of the dive relay 83, or from 74c of the equipment relay 74. The latter provides for excitation of motor 84, assuring a normal flight attitude with respect to the pitch axis of the aircraft should any electrical equipment in the airplane fail to be in normal electrical interconnection.

The elevation signal channel as portrayed in Fig. 6 is precisely the circuit shown in composite showing in Fig. 3 of the illustrative embodiment of the instant invention. The transformer 270C shown herein as a separate unitary element may be electrically a portion of transformer 270 as indicated in Fig. 3c. The inclined bank and climb gyroscope 207 shown symbolically is mechanically coupled as denoted to the rotor of two phase pickoff 14, which provides for the development of a signal voltage in the rotor of pickoff 15 when a displacement from the pitch axis is effective to produce unbalanced voltages in the two phase stator winding thereof. The electro-magnetically induced voltage of the stator winding of pickoff 16 is interposed in series with this A.C. signal voltage. The composite elevation signal as algebraically summed is shown to proceed from the elevator trim potentiometer 17 to followup 18B.

Referring now to the detailed schematic diagram of the dive, level, and post pullout circuits of Fig. 7, assuming the aircraft is in a horizontal flight attitude, the remote keying of the dive command signal will effect energization of relays 88 and 83 through the closed contact of the limit switch 94, shown also in Fig. 2. The 88a—b—c contacts are immediately effective to apply excitation to motor 95, the ground return being made through the deactivated 89a—b contacts of the level relay 89. Thus, a sustained keying sufficient to insure limit operation with motor 95 will induce a predetermined magnitude of dive signal in the angularly displaced rotor of pickoff 15 shown in mechanical coupling relation therewith. Contact 83a connects with the throttle unit proper of the remote control system, and its specific function herein is to interrupt the holding circuit of the particular throttle means in operation, in anticipation of effecting a predetermined dive throttle setting. Contact 83b connects excitation for centering switch 85 to thereby wipe out any residual signal voltage in elevator pickoff 16. Contact 83c supplies voltage to the dive recovery circuit in anticipation of its operation, and activates a tab center relay 42, which controls operation of the trim tab circuit. The specific function of relay 42 and its attendant trim tab circuit will be discussed subsequently in connection with Fig. 8. In addition, contact 83c provides for initial excitation of the dive transfer relays 10 and 91, which have a multifold purpose. Relay 91 in its normally quiescent disposition performs the following: Contact 91a supplies a normal centering (N.C.) voltage to centering switch 173 of the automatic rudder followup trim mechanism 177 through the closed 156a contact in deactivated position of landing trim relay 156, through the 92a—b—c contacts in deenergized position of the post pullout relay 92, to a Z voltage source. In addition, the same voltage source supplies through the deenergized 91b contact a normal centering (N.C.) voltage to the centering switch 119 of the automatic elevator followup trim mechanism 176. Thus, the remote control system normally provides during ordinary flight for a normal position of the stator windings of the rudder and elevator followups 7 and 18. The role of relay 10 in its normally deenergized status is to provide a connection for the aileron signal as selectively made through the 10b contact, while 10c controls uncaging of the dive gyroscope 208. The flow of aileron signals to the 10b contact is shown by the adopted notation to be originated in the stator windings of pickoffs 9 and 13, associated with the inclined bank and climb gyroscope 207 and the dive gyroscope 208, respectively. Conversely in their energized positions, the multifold functions of the dive transfer relays 10 and 91 are as follows: Contact 10a completes the excitation path to switch 120 of the automatic elevation trim mechanism 176, the path being completed through contacts 10a, 89c, 81c, 82c, 83c, when keying is terminated, to the Z voltage source as shown. The significance of this interlocking, as has been previously noted in relation to the abbreviated showing of the same relay contacts in Fig. 6, is to insure that excitation for the automatic elevator followup trim mechanism 176 is supplied only during the execution of a vertical dive. This condition is fulfilled since contact 83c will be in deenergized status by virtue of a limit switch operation performed with switch 94 and motor 95. Contact 10b is closed to provide continuity of the aileron signal as subsequently derived from the dive gyroscope 208, and 10c functions to start the uncaging cycle of this gyroscope by supplying excitation to the dive uncage relay 97, which completes its ground circuit through switch 99 located in caging mechanism 180. Contacts 97a—b—c thereupon furnish voltage for rotation of motor 98, the ground return for this motor being made through the deenergized contacts 96a—b—c of the dive cage relay 96. Contact 91a is a holding contact, which supplies the holding voltage for both relays 10 and 91 from the deenergized contacts of post pullout relay 92, after relays 83 and 88 drop out due to a limit operation having previously taken place. Contact 91b in its energized position supplies from the same voltage source the necessary excitation to centering switch 30 for actuating the dive throttle circuit to position the throttle valve at a setting commensurate for the vertical dive flight of the aircraft. The closing of 91c supplies energization to the followup centering (F.C.) switch 178 through the closed contacts 67c and 70c, of the right turn and left relays, respectively. Thus, upon consummation of the programmed relay sequence as set forth above, motor 95 will have turned to its pre-set limit; the rotor winding of elevator pickoff 16 is centered for null; the dive throttle setting supersedes the existing throttle setting; the automatic elevator and rudder followup trim mechanisms 176 and 77, respectively, are activated; transfer of aileron information is effected; the dive gyroscope 208 is uncaged and the dive recovery circuit is armed with operation thereof held in abeyance pending operation of normal means to restore the aircraft to conventional horizontal flight.

The pilotless aircraft may be returned to level flight at the discretion of the remote operator by keying of level command, or it may be elected that the aircraft be pulled out automatically at a predetermined altitude level by the specific embodiment of the schematically shown altitude switch 90, which may be of a conventional aneroid type. Switch 90 in Fig. 7 functions in a manner electrically equivalent to keying a level command signal. Either is effective to energize level relay 89 through the contacts of switch 94. Thus, contacts 89a—b supply excitation for motor 95 in the sense to reverse the direction of motor 95, the ground return path being completed through the deenergized 88a—b—c contacts. As the rotor of pickoff 15 returns to its initial null position, the aircraft proceeds to pull out from the dive. A sustained keying of the level command signal concludes in a limit operation with motor 95, effecting return of the aircraft to a datum attitude. In addition, it will be noted that contact 89c disrupts the followup centering (F.C.) voltage supplied during the vertical dive to the automatic elevator followup trim mechanism 177, since the aerodynamic requirement for a modified displacement of the followup stator winding is obviated upon return to substantially level flight, at which time the post pullout command signal is keyed.

It will be noted that the 92a—b—c contacts of the post pullout relay 92 provide a holding voltage for the dive and transfer relays 10 and 91 through the 91a contact. Therefore, upon return of the aircraft to level flight a specific keying of the post pullout command signal will disrupt the excitation of these relays to effect return of the remote control system to a quiescent status subject to the characteristic corrective action of the automatic pilot. The deenergization of dive transfer relay 91 provides a discontinuity in the excitation path supplying switch 178 of the automatic rudder followup trim mechanism 177 by breaking contact 91c and a discontinuity in the excitation path supplying switch 120 of the automatic elevator followup trim mechanism 176 by breaking contact 10a. Therefore, the stator windings of both followups 7 and 18 revert to normal upon terminating the keying of the post pullout command signal, by supplying excitation to the normal centering switches 173 and 119 through the deactivated 91a and 91b contacts, respectively, and the 92a—b—c contacts in deenergized position, to the Z voltage source. The 10c contact of the dive transfer relay 10 provides a Z voltage connection with the dive caging relay 96, the ground therefor being completed through limit switch 99. Contacts 96a—b—c in energized position thus supply a voltage in a polarity sense to reverse rotation of caging motor 98, thereby effecting caging of the dive gyroscope 208 at this time. Concurrently the 10b contact effects transfer of aileron signal information from dive gyroscope 208 to the inclined bank and climb gyroscope 207. Thus, momentary keying of a post pullout command signal culminates the vertical dive operation by returning the relays of the remote control system to a normal status. Therefore, the aircraft is now disposed in relatively level flight under the characteristic prevailing control of the automatic pilot.

In addition to the circuits response to the dive, level, and post pullout commands, there is shown in Fig. 7 an electrical schematic circuit for effecting automatic dive recovery by means of auxiliary dive recovery flaps not shown, in the event of malfunction of the normal dive recovery means. As illustrated, the dive recovery circuit employs an altitude limit switch 101 which closes at a lower altitude level than altitude switch 90. Presuming the aircraft is at this lower altitude level, the voltage supplied to switch 101 from the 92a—b—c contacts in deactivated position, through 91a in activated position, is impressed on a differential pressure switch 102, which is responsive to differential pressure in the elevator hydraulic servo. Switch 102 is normally maintained closed, except when such a differential pressure is coexistent with a concomitant displacement of the elevator surface. Consequently, if normal dive recovery means instrumental to terminate the vertical dive has not been effectual to impart appropriate elevator displacement, the resulting streamlined elevator surface tantamount to zero differential pressure, will maintain switch 102 in the closed position. In this case, flap opening relay 105 will be energized through limit switch 107 to ground, since the altitude switch 101 and differential switch 102 are closed under the conditions set forth above. Contacts 105b—c close to supply excitation for the time delay motor 108 which rotates of the order of 4 seconds before incurring limit operation with switch 107, at which instance time relay switch 104, shown mechanically coupled to the time delay motor 108, concurrently closes, effecting energization of dive recovery relay 100, held thereafter closed by a holding voltage supplied through its 100a contact. Contacts 100b—c in energized position control actuation of a dive recovery motor, not illustrated, which runs out the dive recovery flaps. In the event that hydraulic flap actuators are employed, it is understandable that a transfer valve responsive to contacts 100b—c may be conveniently used in lieu of a motor. In order to achieve opening of the dive recovery flaps with the arrangement described above, the closing of differential pressure switch 102 must be of the duration of at least 4 seconds to effect a limit operation with time delay motor 108; otherwise, deenergization of relay 105 will cause motor 108 to run in a reverse direction until it reaches its opposite limit with limit switch 107. This reversal of rotation is accomplished by energization of the flaps closing relay 106 through contact 105a in deenergized position, the ground therefor being completed through limit switch 107. In any case, dive recovery flaps are automatically closed upon interruption of the holding voltage as supplied from the deactivated contacts of the post pullout relay 92, which is thus instrumental upon momentary keying of the post pullout command to initiate closing of the dive recovery flaps. The 100b—c contacts in deactivated position thereby provide a reverse connection to a dive recovery motor for closing the dive flaps.

Fig. 8 portrays an electrical schematic diagram of the trim tab apparatus incorporated in the instant invention, the paramount function of which is to maintain a trim attitude of the aircraft during normal level flight, and in a vertical dive attitude when tactical circumstances dictate the execution of such a maneuver. It will be recognized that except for the embodiment of such trim means, the hydraulic system of an automatic pilot would otherwise be continuously biased to effect a constant displacement of the control surface necessary for the maintenance of trim flight. A differential rather than a balanced hydraulic pressure would exist in an actuating hydraulic servo associated with a given control surface, and in effect the hydraulic system of an automatic pilot would be continually "working." The trim tab apparatus of the remote control system obviates this deficiency by any one of three distinctive means, namely, through the use of differential pressure switches, each of which permits actuation of a D.C. motor mechanically linked with a trim tab disposed on a trailing edge of a primary control surface; through the use of pre-set cams, the contour surface of which positions respective switches effective to initiate motor operation during either level or vertical dive flight; and through the use of a pilot control switch which may be manipulated by the pilot when the aircraft is so controlled. Of the first two means one must be selected prior to remote controlled flight with appropriate modification of circuits activated as indicated below.

First, manual adjustment of the trim means will be discussed in relation to the operation of the elevator trim tab, which is illustrative of the structure and operation of the aileron and rudder tab means. Hence, the following exemplary treatment of the trim tab circuits will relate to the elevator trim tab circuit proper. Switch 38 is a power switch which when thrown to the On position, permits application of power through contact 38a, to the 47a—b—c and 48a—b—c contacts of the elevator Up tab relay 47 and elevator Down tab relay 48, respectively. Contact 38b permits application of power through the 41a—b contact in deenergized position of equipment interlock relay 41, to the common armature members of a manual trim switch 40. Therefore, assuming automatic tab switch 39 to be in an Off or neutral position, excitation may be applied by discrete manipulation of manual switch 40 to the various relays which initiate actuation of the trim tabs, as designated. Thus, the excitation available on the armature of the elevator designated portion of switch 40 will energize the elevator Up tab relay 47 when the armature is pushed to the left or Up position, and conversely, the elevator Down tab relay 47 will be energized when the relay is pushed to the right or Down position, as shown in Fig. 8. The excitation of relay 47, taken as an example, supplies through its 47a—b—c contacts the power required for actuation of motor 51, the path being completed through lower limit contact 59, the armature and field windings of motor 51, to ground. The motor rotates, concurrently positioning the elevator trim tab by a suitable linkage not illustrated. Conversely, the energization of relay 48 in response to positioning of the elevator trim tab switch in the Down position, will effect reverse rotation of motor 51 by completing a circuit path from the 48a—b—c contacts, through upper limit switch 50, the common armature and alternate field windings, to ground. Conventional limit operation with limit switch 50 will terminate motor rotation if the elevation trim tab switch is held continuously. Thus, in this manner, appropriate trim tab positions are obtained for the primary control surfaces associated therewith. Control of the rudder and aileron trim tabs is achieved by similar manipulation of the corresponding circuits for positioning these elements.

Prefatory to throwing the automatic tab switch 39 to the On position, an arbitrary election must be made of the use of either the differential pressure switches or pre-set cams. If differential pressure switches are elected to be employed, tab center relay 42 must be disabled so as not to energize either the level flight relay 43 or the dive relay 44. In this particular mode of operation, the differential pressure switches 46 are in respective parallel connection with the contacts of the manual trim switch 40. Thus, assuming switch 39 in the On or automatic tab position and the elevator differential switch so disposed as to require an up tab adjustment, the excitation path for relay 47 is as follows: The Z voltage source, the closed contacts of switch 39, contact 38c of the power switch 38, through the 41c contact in energized position of the equipment interlock relay 41, to the elevator armature member of the differential pressure switches 46 and through the closed upper contact of the elevator element thereof, to relay 47, and finally to ground. Motor 51 operates in a manner previously described. Thus, when the contacts of differential pressure switches 46 have occasion to close due to existent differential pressures in the hydraulic servos associated with the primary control surfaces, the trim tabs are actuated in a direction to relieve the differential pressure, effecting "unloading" of the automatic pilot and trim flight of the aircraft.

In the alternate mode of automatic operation wherein use is made of pre-set cams to achieve trim flight of the aircraft, the differential pressure switches 46 must be disconnected. Two flight operating conditions govern the selection of the pre-set cams, namely, level flight at an arbitrary cruising speed, and vertical dive flight. Thus, the level flight relay 43 shown in Fig. 8 is normally energized through the quiescently disposed contacts of 42b—c of the tab center relay 42, except when keying a vertical dive command signal. In activated position of relay 43, the 43c contact thereof supplies excitation to the armature designated as C1 of the cam actuated switch 49.

By means of comparable connections, contacts 43a and 43b supply excitation to the respective armatures of the rudder and aileron trim tab components 56 and 53, respectively. During operation in level flight, therefore, the armature C1 is neutrally disposed on the slope of cam 186. At any other relative disposition between the armature and cam surface, electrical connection is provided to either of the relays 47 or 48, and appropriate rotation takes place to neutrally position armature C1 on the slope of cam 186, concurrently actuating the elevator trim tab for normal level flight. When vertical dive is keyed, the tab center relay 42 is energized as previously noted in connection with Fig. 7. The 42b—c contacts in activated position, actuate dive relay 44, the 44c contact thereof supplying on this occasion an excitation voltage to the armature member C2 of cam switch 49, and the subsequent operation of motor 51 is precisely analogous to the operation previously set forth. Contacts 44a and 44b supply excitation to the C2 armatures of the rudder and aileron trim tab components 56 and 53, respectively. Thus, in vertical dive flight of the aircraft, a trim attitude is maintained. The keying of a post pullout command signal returns the tab center relay 42 to the quiescent status.

Referring now to Fig. 9, the instant remote control system embodies a throttle control means to insure the maintenance of an engine speed which is compatible with anticipated flight requirements at all times. Thus, Fig. 9 portrays electrical circuits responsive upon selective keying of appropriate command signals to actuate an engine throttle valve 184, shown schematically in mechanical coupling relation with hydraulic servo 132, which also drives a cam 185 having a representative profile as indicated. Cam operated switches 29 and 30 establish automatic cruise and dive throttle settings, respectively, of the schematically portrayed throttle valve 184, the armatures of these switches being disposed to ride on the surface of cam 185. An On-Off transfer valve 129 of a conventional solenoid type is used to control flow of high pressure oil to servo 132. A high pressure inlet 260 is a part of the high pressure line of the aircraft hydraulic system, and supplies the necessary high pressure fluid to transfer valve 129. A control valve 131 is employed in the airspeed throttle circuit, the express function of valve 131 being more concisely delineated below with respect to Fig. 10. The RC components designated as 36 comprise an anti-spark network for the contacts disposed in parallel connection therewith.

Direct throttle control is provided by selective excitation of relays 31 and 32 in response to the throttle-on and throttle-off commands, respectively. Contacts 31a—b—c in activated position energize an intermediary throttle valve-on relay 34. The contacts 34a—b—c supply excitation directly to the On winding of transfer valve 129, initiating actuation of the hydraulic servo which opens throttle valve 184. The closing of the throttle valve is performed in a comparable manner by energizing relay 32 in response to the throttle-off command. A minor structural variation provides for interlocking the Z voltage through the 31a—b—c contacts in deenergized position of the throttle-on relay 31 before the 32a—b—c contacts can be rendered effectual in energizing the corresponding intermediary throttle valve-off relay 35. Thus, simultaneous excitation of both windings of transfer valve 129 is prevented. It should be noted that the inherent operation of the respective circuits which include the throttle-on relay 31 and throttle-off relay 32 provides displacement of throttle valve 184 as a direct function of time. Therefore, intermediate throttle settings are possible by discrete keying of the pertinent command signals for specific lengths of time.

The keying of the automatic cruise command signal is instrumental to position throttle valve 184 at a predetermined setting commensurate for takeoff or climb of the pilotless aircraft, in accordance with servo loop operation as dictated by the configuration given cam 185. Specifically, the initial keying of this command effects energization of relay 33 which is then held energized by holding contact 33a through which the Z voltage excitation is supplied. The voltage originates from the deenergized closed contacts 31a—b—c, 32a—b—c, 83a of dive relay 83, 24b of the airspeed throttle relay 24, to 33a. The special interlocking as denoted insures selectivity of throttle operation. Contact 33c supplies excitation to the armature member of cam operated switch 29. It will be seen that the contacts disposed adjacent the armature of switch 29 are respectively connected to the throttle valve On and throttle valve Off relays 34 and 35. Therefore, excitation of either of these relays is directly provided as in direct throttle control by the continuity afforded through switch 29, so long as the armature member thereof is not neutrally centered on the cooperating sloping surface of cam 185 when automatic cruise is keyed. Servo 132 responds in characteristic manner, as previously described, until the armature member is neutrally disposed to break the circuit continuity of either of relays 34 or 35. Thus, an automatic cruise setting of throttle valve 184 is provided in the instant remote control system according to the preset disposition of the slope on cam 185.

The operation set forth above for bringing about an automatic cruise position of the throttle valve may be reiterated with respect to obtaining a predetermined dive throttle setting in connection with switch 30. It is sufficient merely to note that the Z voltage source is applied through the 91b contact of dive transfer relay 91 to the armature member of switch 30, during the execution of a vertical dive, to provide appropriate displacement of servo 132 through relay 31 or 32. Concurrently, contact 83a of the dive relay 83 interrupts the holding circuit of either the automatic cruise relay 33 or airspeed throttle relay 24, if either is in operation.

The airspeed throttle circuit shown in Fig. 10 comprises essentially an electro-hydraulic servo system which maintains the throttle valve 184 at a setting commensurate with a predetermined arbitrary flight speed which may conveniently be a speed suitable for landing. Thus, with respect to Figs. 9 and 10, the keying of the airspeed throttle command is effective to actuate airspeed throttle relay 24 and open an airspeed control valve 131 normally effective to cut off the hydraulic line from transfer valve 130 shown in Fig. 10 to the hydraulic servo 132. A holding voltage, supplied to the 24a contact and series interlocked in common with the automatic cruise throttle circuit, maintains excitation for relay 24 and the solenoid of transfer valve 131. Fig. 10 portrays the essential elements of the air speed throttle electro-hydraulic servo unit. The rotor of an inductive pickoff 20 is illustrated to receive displacement from a diaphragm 183 which is sensitive to changes in airspeed. A potentiometer 26 connected to an isolation stepdown transformer 274 provides a range of adjustments, whereby a zero signal is maintained in the closed signal circuit comprising in series the stator windings of pickoff 20 and followup 21 including calibration potentiometer 26 when the airspeed is at a desired value. Voltages induced in the stator winding of pickoff 20 above or below the desired airspeed are impressed on to amplifier 23, the output of which is comprised of the solenoid of transfer valve 130. A sensitivity potentiometer 25 is connected to a suitable excitation source and applies a proportionate A.C. voltage to the rotor or primary of followup 21. Hydraulic servo 132 is shown mechanically coupled to commonly drive throttle valve 184 and the rotor of followup 21. The airspeed throttle unit as portrayed in Fig. 10 is continually connected into the system save for the application of a $b+$ voltage to amplifier 23 through the windings of the transfer valve 130. Contact 24c thus completes the final link in the energization of the airspeed throttle unit by supplying the required $b+$ voltage upon receipt of an airspeed throttle command signal.

The dynamic operation of the airspeed throttle electro-hydraulic servo unit is not unlike the operation denoted in similar servo loops of the remote control system. Whenever the algebraic summation of the A.C. signal voltage appearing at the input of amplifier 23 is other than zero, the airspeed of the aircraft is of course at variance with the desired airspeed as calibrated with potentiometer 26, and a D.C. output is applied to the differentially operative solenoid of transfer valve 130, making servo 132 respond to thereby rotate both the rotor of followup 21 and throttle valve 184. Because of the nature of the circuit, the voltage induced in the stator of followup 21 is always opposite in polarity to the displacement signal voltage introduced into the pickoff 20 that causes servo 132 to move initially; therefore, the action tends to stop further motion of the servo. As the servo system makes correction in a throttle valve setting and the aircraft responds accordingly by effecting the change in airspeed, the orignal displacement signal voltage is reduced and becomes smaller than the followup voltage. The net signal voltage appearing at amplifier 23 is now reversed and causes return of throttle valve 184 to a new setting. Diaphragm 183 ultimately displaces the rotor of pickoff 20 an amount necssary to approach zero signal in the closed circuit. Thus, the nature of the airspeed throttle unit is to continuously make incremental corrections in throttle valve setting in order to maintain a constant desired speed of the aircraft.

Fig. 11 depicts an electrical schematic diagram of the landing gear, landing flaps, and engine cowl flaps circuits of the remote control system. Relays 58 and 61 are of the DPDT ratchet type, requiring a single impulse for actuating and maintaining the armatures thereof in a given position. Therefore, the armature member of either of these relays is alternately connected from one set of contacts to another set, each time the relay is energized. Relay 58 is responsive to a keyed landing gear command signal and concurrently initiates through series interposed switches a landing gear actuator 60 and a cowl flap actuator 63, which may be conventional direct current motors having armature and field windings as illustratively indicated in actuator 60, for enabling reciprocal rotation thereof. Limit switches contained internally in actuator 60 render the actuator inoperative when the landing gear is in either limit position. Switch 59 is mechanically operated by actuation of the landing gear, and it is in open position when the landing gear is fully extended, thus preventing accidental actuation thereof when the aircraft is on the ground. A lamp glows on the instrument panel to inform the pilot that the landing gear is up, when the aircraft is so piloted. Switch 64 is a manual reversing switch for the purpose of closing or opening the engine cowl flaps preparatory to take-off, thus affording a measure of selective control over the regulation of engine temperature prior to take off, independent of keyed command signal. Landing flaps actuator 62 is identical to its companion actuators 60 and 63, and it is actuated by relay 61 in response to a keyed landing flaps command signal.

Since landing trim relay 156 is concurrently energized by the landing flaps command, the 156b contact thereof is effective to supply a followup centering voltage (F.C.) to the armature member of switch 178 of the automatic rudder followup trim mechanism 177. In addition, contact 156a disrupts normal centering (N.C.) excitation to the armature member of switch 173. These specific operations of relay 156 can best be seen with respect to Fig. 3c and Fig. 7. Such operation of relay 156 and the elements operatively connected thereto provides for employment of the automatic rudder followup trim mechanism 177 in accordance with aerodynamic requirements for appropriate rudder followup trim of the pilotless aircraft on landings, in response to the keyed command signal specifying the operation of landing flaps.

The express operation of landing gear actuator 60 which is also representative of the operation actuators 62 and 63 commences with the energization of relay 58. Assuming the pilotless aircraft has been airborne, switch 59 is closed as portrayed and relay 58 has taken the indicated position in response to a keyed landing gear command. A 24 volt D.C. source is now connected through the 58a—b contacts, the upper contacts of switch 59, the upper limit switch, common armature and field windings of the actuating motor 60, to ground. The motor rotates until the upper limit switch associated therewith opens, at which time the operation is terminated. Thus, the landing gear is retracted, and the indicating lamp glows. A second keying of the landing gear command signal results in the armatures of relay 58 taking an opposed position to now supply excitation to the lower contact of switch 59, the lower limit switch, common armature and alternate field windings of actuating motor 60, to ground. The motor now rotates in an opposite direction until the lower limit switch mechanically coupled therewith opens, terminating rotation. The landing gear is now fully extended. It is to be understood that the cowl flaps actuator 63 is operated concomitantly with the landing gear actuator 60 in response to a landing gear signal.

The electrical aspects of the automatic brake system are best seen with respect to Fig. 12 of the drawing. The braking system is of the general type described in U.S. Patent No. 2,444,927, issued July 13, 1948, to Charles E. Gallagher. In essence, the instant remote control system provides for the superimposition of the brake system as described in the referenced patent onto the rudder signal channel of the inventive remote control system of the aircraft, whereby a rate of turn signal is introduced in addition to the displacement signal derived from a directional gyroscope when a deviation from a prescribed course is incurred. Further, since the brake system is superimposed on the rudder signal channel, a shift in directional reference is very simply obtained by keying a right or left turn signal during braking, affording the remote operator a considerable facility in control of the aircraft upon landing.

Fig. 12 portrays essential elements of the braking system disposed in common with electrical components of the rudder signal channel. Since only the brake signal channel as denoted by the quadruplex arrowhead notation is pertinent herein, no discussion of the rudder signal channel is contemplated except where it significantly relates to the braking system. Thus, there is shown in Fig. 12 a rate signal unit 272 comprising a turn rate gyroscope 116 having an internally contained synchronous motor as indicated by the adjacent tertiary windings. A three-phase transformer 117 is shown in symbolic representation and supplies the necessary excitation for this motor to drive the spin axis of the rate gyroscope. A rotor of a controlled transformer 115 is shown in mechanical coupling relations for obtaining angular displacement proportional to the rate of deviation of the aircraft from a prescribed course, the instant polarity of this derived signal being the same as for the directional gyroscope. A Selsyn transmitting system contained within the rate signal unit 272 is shown to derive its excitation from a rotor winding which is disposed in series with appropriate resistances connected across a phase of transformer 117. Thus, a rate of turn signal voltage has its origin in the rotor of control transformer 115 and is applied to the primary of transformer 113 of suitable transformation ratio for introduction into the brake signal channel.

On application of the brake command signal by the remote operator, brake transfer relay 4, the brake uncaging relay 75, the control valve relay 112, and the brake transfer relay 6 are energized. Transfer relay 4 performs the following: Contact 4a transfers the A.C. excitation supplied to the rotor of pickoff 3 from rudder rate potentiometer 152 to the brake rate potentiometer 151. Contacts 4b and 4c in DPDT connection substitute the brake trim potentiometer 154 for the rudder trim potentiometer 5. The purpose of contact 75b is to prevent application of the holding voltage from contact 69b through the 2a contact of caging transfer relay 2. Contact 75c in energized position prevents energization of caging transfer relay 2. Therefore, brake uncaging relay 75 permits use of the directional gyroscope 206 during braking. The 112a—b contacts of relay 112 apply a Z voltage source to the solenoid of the general control valve 135, which functions to apply hydraulic pressure to the brake system. The 6a contact of brake transfer 6 in energized position connects the brake signal in lieu of the rudder signal to the input of rudder signal servo amplifier 204. Contacts 6b and 6c in DPDT connection effect substitution of the brake transfer valve 137 for the normally connected rudder transfer valve of the automatic pilot, herein designated as 127A. The output of rudder servo amplifier 204 supplies the required D.C. excitation for either of these valves through the aforesaid contacts. The differentially operative current coils 155 are a part of the gyroscope instrument proper, and are normally employed for synchronizing purposes. Sensitivity of followup 140 is controlled by application thereto of a fractionate voltage from potentiometer 114, which is disposed in series with the dropping resistor, not numbered, across a suitable source of excitation.

Assuming the relay coils controlling application of the brakes of the pilotless aircraft are in an energized status, the normal rudder displacement signal, as may be augmented by the turn insertion mechanism 360, appears at contact 4c, and thence it is directed through the brake potentiometer 154, contact 4b, through the stator winding of the brake followup 140, transformer 113 wherein the secondary winding effects insertion of a series rate of turn signal voltage, contacts 6a, and finally to servo amplifier 204 of the rudder signal channel. A D.C. voltage proportional to the amplitude of the applied signal as algebraically summed appears in the output of amplifier 204, and constitutes a brake valve signal which is applied through the contacts 6b and 6c in actuated position to the solenoid of brake transfer valve 137, which thereupon effects actuation of the brakes of the aircraft. The rotor of followup 140 is indicated to be in mechanical coupling relation with the brakes, so that ordinary followup action may take place. The dynamic operating characteristics of the brake system does not substantially differ from the operation of other closed servo loop circuits of the remote control system, and in this respect the description set forth above is deemed sufficient.

An alternative configuration of the instant invention comprising a system of introducing rate signals by means of rate gyroscopes is best shown in Fig. 13 of the drawings. Inasmuch as the elevator and aileron control system is very similar to the rudder system, the latter only has been shown as representative of this means. It is to be understood that the lettered designations represented as switches may actually be relays or other switching means described heretofore in the detailed description of the individual circuits.

In normal level flight conditions switches A, C, D and K are closed, the other switches being open. Under level flight conditions it is therefore seen that the directional gyroscope 206 in the auto pilot takes control of deviations from course. The circuitry includes the directional gyroscope 206, the rudder followup 7 in series with that gyroscope, a rate gyroscope 350 feeding a normal flight rate signal into the rudder servo amplifier 204, signals from the rudder servo amplifier 204 being converted from electric to hydraulic signals in the rudder transfer-valve 127 to operate the rudder servo 128.

On keying a turn, switch means B, C, E and K are closed, the other switch means remaining open. The turn signal is sent from transmitter 300 and received in receiver channel selector 200. The signal is fed into means to operate the bank and turn motor 78 in such direction as to cause signals to originate in pick-offs, the signal for turn being conveyed through contact B and contact C and the rudder followup 7 directly into the rudder servo amplifier 204. The rate gyroscope 350 for normal flight is cut out during keying of turn by opening of the contacts represented as D. The turn signal is then fed from the rudder servo amplifier 204 after being rectified and amplified in that unit to the rudder transfer-valve 127 where it is converted to a hydraulic signal and fed to the rudder servo 128. The group of contacts B, C, E and K remain closed only while the turn is being keyed.

For the duration of the turn switches, B, C, E and K are closed, the remaining switches being open. Thus, after the turn signal key has been released, the rate gyroscope signal for normal flight is again fed into the rudder servo amplifier 204 to be transmitted to transfer-valve 127 and thence to the rudder servo 128.

On performing a centering operation, the right and left signals from the transmitter 300 are received in receiver channel selector 200, contacts B, C, E and K remaining closed while this binary keying is being performed. The rate gyroscope normal flight signal is therefore not fed into the system while the centering operation is being performed.

During keying of an automatic take-off contacts, A, C, F, H, and K are closed, the remaining contacts being open. Contact A is shown as closed so that the gyroscope 206 is not caged during automatic take-off; any operation causing caging, on being keyed will take the system out of automatic take-off. Thus, the directional gyroscope 206 retains control under take-off conditions. The rudder followup 7 remains in series with the directional gyroscope 206, the rate gyroscope 350 for normal flight is cut out of the system, and the automatic take-off rate gyroscope 351 is fed to introduce the proper rate signal for automatic take-off conditions into the rudder servo amplifier 204 from whence the signal is fed in to the rudder transfer-valve 127 and on to the rudder servo 128. This enables substitution of the automatic take-off rate gyroscope signal for the rate gyroscope signal for normal flight.

On keying brakes, switches A, G, I and J remain closed; the remaining switches are open during this operation. The directional gyroscope 206 is thus in the system during brake operations and caging is prevented. The brake rate gyroscope signal is now in series with the directional gyroscope 206 and signals from the brake rate gyroscope 116 are fed through brake followup 140 into the rudder servo amplifier 204. The rudder transfer-valve and the rudder servo 128 are by-passed because switch K is open, switch J permitting feeding of the amplified and rectified signal from rudder servo amplifier 204 into the brake transfer-valve 137 and the brake transfer-valve 137 governs brake operations as shown in the figure. In the above described manner the directional rate gyroscopes provide rate signals to the rudder for take-off, other rate signals of differing intensity to the rudder during normal flight, and a third group of rate signals are added to the brakes after landing. In a similar manner a roll rate gyroscope (not shown) provides a rate signal to the aileron at all times during flight with the gear in operation. The pitch rate gyroscope (not shown) provides a similar signal to the elevator control surfaces. Appropriate changes are made to incorporate these added rate signals into the control gear circuits and relays are provided as a means of removing these signals when necessary. These provisions are made in a similar manner to the provisions for rate signals being introduced into the rudder control system. In the manner shown in Fig. 13 and described above, gyroscope signals proportional to the rates of roll, yaw and pitch during normal flight and maneuvering the aircraft are added to the control gear circuits in addition to the rate signals for take-off, and the directional rate signal for brakes.

Various modifications are contemplated and may obviously be resorted to by those skilled in the art without departing from the spirit and scope of the invention. For example, it has been shown in Fig. 13 that gyroscope signals proportional to the rates of roll, yaw and pitch during normal flight and maneuvering of the aircraft may be added to the control axis signal channels. In addition, since various circuits of the remote control system are responsive to radio command signals as a direct function of time, a rate selector capable of discretely keying a command for a finite time interval may be employed to select, for example, a predetermined radius of turn, or dive angle. Such a timing means may partake of the form of a modified type of telephone dial. Further, installation of a throttle creep prevention circuit effective to maintain the throttle at any given setting may be readily embodied by those skilled in the art.

Thus, the remote control system as described presents a feasible means for the radio guidance of a pilotless aircraft. The system provides means whereby an aircraft may be guided from a remote point so as to perform all of the maneuvers which a human pilot in the aircraft could accomplish including take-off, climb, turn and bank, landing, diving, and other aerobatics and operations. Particularly noteworthy is the aircraft's unique capability for executing a precision vertical dive, a maneuver deemed tactically desirable, for instance, in vertical dive bombing operations. Provision is included in the illustrative embodiment to prevent deviation of the pilotless aircraft from a vertical dive flight path, which is maintained substantially coincident with a normal to the earth's surface. In addition, the remote control system embodies an automatic pull-out feature, which functions at a predetermined altitude level, and finally, to insure a maximum degree of reliability, a dive recovery flaps circuit is also incorporated.

Obviously many modifications and variations of the present invention are possible in the light of the above teaching. It is, therefore, to be understood that within the scope of the appended claims the invention may be practiced otherwise than as specifically described.

What is claimed is:

1. Remote control apparatus for a pilotless aircraft having a longitudinal axis and including control mechanisms for performing flight maneuvers, said apparatus comprising means for producing signals representing operation functions in the aircraft, means for introducing the signals into the respective control mechanisms, an automatic pilot having a first gyroscope assembly effective to establish a predetermined reference attitude with respect to yaw deviation, a second gyroscope assembly normally effective to establish a predetermined reference attitude with respect to pitch and roll deviation and a third gyroscope assembly effective to establish a predetermined reference attitude with respect to roll deviations when the longitudinal axis of the aircraft is at an angle so large with respect to the horizontal that the second gyroscope is ineffective to maintain control with respect to said roll deviations, pick-off means in each of said gyroscope assemblies to initiate signals responsive to deviations from the predetermined reference attitude determined by each gyroscope assembly in operative condition of the respective assembly, switching means connected to the pick-off means of each of said gyroscope assemblies and adapted to selectively decouple the signals with respect to roll deviations in said second gyroscope assembly and to couple the signals with respect to roll deviations in said third gyroscope assembly for control of the pilotless aircraft under particular ambient aircraft attitude conditions, means responsive to said deviation signals to restore the aircraft to predetermined attitude and means responsive to said operation function signals to effect corresponding change of predetermined reference position.

2. The structure of claim 1 wherein said control mechanism includes remotely actuated throttle means for normal flying at constant air speed, remotely actuated throttle means for cruising at a constant throttle setting, remotely actuated throttle-On means, remotely actuated throttle-Off means, remotely actuated brake control means, remotely operated landing and take-off attitude control means and automatic follow-up trim means for changing aircraft control surfaces with changes in speed.

3. A remote control system for pilotless aircraft comprising an automatic pilot having at least three gyroscopes, pick-offs mounted on said gyroscopes, a first gyroscope having its spin axis mounted in a substantially horizontal plane, a second gyroscope having its spin axis mounted at a relatively large angle to the horizontal plane, a third gyroscope mounted with its spin axis in a substantially horizontal plane, means on said first gyroscope to control rudder surfaces of the aircraft, means on said second gyroscope to constantly control elevator surfaces and to control aileron control surfaces in level and relatively small pitch attitudes, means on said third gyroscope to control the aileron surfaces in pitch attitudes such that the longitudinal axis of the aircraft is at an angle so large with respect to the horizontal that the second gyroscope is ineffective to maintain control, switching means to switch said aileron control means between said second and said third gyroscopes, and means to introduce remotely actuated maneuvering signals into the system.

4. A remote control system for pilotless aircraft comprising a transmitter for transmitting signals of channel frequencies, a channel selector receiver mounted in an aircraft, a plurality of gyroscopes, at least one inductive pick-off mounted on each of said gyroscopes, displacement of the aircraft from a preset attitude causing corresponding displacement of stator from rotor of one or more of said gyroscope pick-offs, a servo amplifier in the circuit of said gyroscope pick-offs, signals from said inductive pick-offs being fed to said servo amplifier and amplified and rectified therein, a transfer-valve to convert said rectified and amplified electrical signals to hydraulic signals, a plurality of servo motors, said servo motors being actuated by said transfer-valve output hydraulic signals, linkage mechanism driven by said servos and connected to the control surfaces of the aircraft, action of said servo motors in response to said hydraulic signals causing said linkage to manipulate the control surfaces of the aircraft, a plurality of second inductive pick-off units connected in the circuit between said gyroscope pick-offs and said servo amplifier, means to cause said last named pick-offs to initiate a signal in response to signalled operations from said transmitter received at said receiver, means to disconnect said gyroscope pick-offs from said circuit during receiving of remote signals from said transmitter, means to cage selective gyroscopes of said plurality of gyroscopes during receiving of signals from said transmitter, follow-up devices for each of said gyroscopic devices, said follow-up devices being linked to said control surfaces, thereby being actuated by movement of said control surfaces and generating a voltage to restore the surfaces to neutral position on effecting operations, means to perform selective throttle settings, and means to perform braking operations, said last named means comprising pick-off means to initiate signals for performing said braking operations upon receiving signals from said transmitter.

5. Control apparatus for aircraft comprising a directional gyroscope for control of rudder surfaces, a normal flight bank and climb gyroscope for control of elevator surfaces and for control of aileron surfaces in approximately level flight conditions, a dive gyroscope for control of aileron surfaces in conditions of large enough angle of the longitudinal axis of the aircraft from the horizontal such that the normal bank and climb gyroscope would lose aileron control, a pick-off sensitive to yaw of the aircraft mounted on said rudder control gyroscope, at least one pick-off sensitive to pitch mounted on said normal bank and climb gyroscope and being normally operative, a pick-off sensitive to roll mounted on said normal bank and climb gyroscope, said last named pick-off being in operative condition during comparatively level flight conditions, a pick-off sensitive to roll mounted on said dive gyroscope and operative in conditions of relatively small angle of the longitudinal axis of the aircraft from the vertical where the dive gyroscope only would retain effective control and switching means to switch between said normal aileron pick-off and said dive aileron pick-off.

6. Apparatus for introducing remotely keyed signals into an automatic pilot to direct maneuvers of an aircraft comprising a relay energizable on keying a desired signal, a reversible motor electrically connected to said relay and operable by closing of the normally open contacts of the relay, an output shaft on said motor, a gear train driven by said output shaft, a cam mechanically connected to one gear of said gear train, a limit switch mechanically coupled to said cam for limiting rotation of said motor, a centering switch mechanically coupled to said cam and electrically connected to said motor to drive said motor to center position when said relay is not being keyed, an inductive signal transformer mechanically driven by one of the gears of the gear train, said inductive signal transformer having a rotor and a stator, the rotor being the element driven by the motor, adjustable means to regulate the amount of displacement of the rotor with respect to the stator for a given rotation of the motor, a servo amplifier to amplify and rectify signals from said inductive pick-off unit, a transfer-valve to receive electrical direct current signals from said servo amplifier and convert said signals to hydraulic signals, a servo engine actuated by the signals from the transfer-valve, means mechanically linked to the servo engine to move the control surfaces and other controls of the aircraft, a follow-up inductive unit to introduce voltages of opposite polarity to the voltages induced by action of the motor to restore controls to neutral position when desired operation is effected, adjustment means for said follow-up unit and electrical means to supply electrical power to said system.

7. In a remotely controlled aircraft having an automatic pilot including a plurality of gyroscopes and means to convert signals emanating therefrom to movement of aircraft control surfaces, signal circuits comprising a rudder circuit, an aileron circuit and an elevator circuit, said rudder circuit including a rudder pick-off mounted on a directional gyroscope, means to transmit signals arising at said rudder pick-off to a servo amplifier, means to transmit signals amplified and rectified in the servo amplifier to a transfer-valve, means to convert the signals fed to the transfer-valve to mechanical movement of a rudder control surface, means to inject signals resembling signals arising at a gyroscope into the rudder circuit system and to simultaneously cage the rudder circuit gyroscope, and means to convert said last named signals to movement of said rudder, means to generate signals at an elevator pick-off on a turn and bank gyroscope, means to transmit said signals to a servo amplifier, means to transmit signals amplified and rectified in the servo amplifier to a transfer-valve, means to convert said last named signals to mechanical movement of the elevator of an aircraft, means to feed remotely keyed signals for climb and dive into the elevator circuit, means to feed the climb and dive signals into a servo amplifier, means to transmit the servo amplifier output amplified and rectified climb and dive signals to a transfer-valve and means to convert said last named signals into mechanical movement of the elevator control surfaces, the aileron circuit having means at the turn and bank gyroscope to initiate a signal, means to feed the turn and bank gyroscope signal to a servo amplifier, means to feed the signal amplified and rectified in the servo amplifier to a transfer-valve, means responsive to the signal output of the transfer-valve to move aileron control surfaces, means to inject aileron affecting signals into the aileron circuit, means to transmit said signals to a servo amplifier, means to convey the signals from the servo amplifier to the transfer-valve and means to manipulate aileron control surfaces in response to said last-named signals from the transfer valve, means to switch off last-named aileron signal sources under dive conditions, means to interpose a dive gyroscope having a dive pick-off in the aileron circuit during dive conditions, means to transmit signals from said dive gyroscope pick-off to a servo amplifier, means to convey the amplified and rectified signals from the servo-amplifier to a transfer-valve and means to convert said transfer-valve output to mechanical manipulation of the aileron control surfaces.

8. In a remote control system for guidance of pilotless aircraft, a rudder control circuit comprising a directional gyroscope, a rudder pick-off unit mounted on said directional gyroscope responsive to yaw of the aircraft to initiate an electrical signal, a caging transfer relay having a normally closed contact in series with said pick-off unit, a dummy load for producing a null signal voltage, a second inductive pick-off unit in series with a normally open contact of said relay and with said rudder pick-off for introducing a command signal, whereby said normally closed contact opens to disconnect said rudder pick-off and said normally open contact closes to connect said dummy load during signal introduction, a trim potentiometer in series with said last named relay contacts, a rudder follow-up unit in series with said circuit, a servo amplifier to amplify and rectify signals from said gyroscope pick-off unit and means to convert said signals to mechanical movements of the rudder control surface in response to signals impressed from the rudder circuit.

9. The circuit of claim 8 wherein said second pick-off unit further comprises a rotor and a stator, said rotor being driven by remotely controlled means to initiate turn signals.

10. Apparatus for remotely controlling a pilotless aircraft comprising a first gyroscope pick-off generating signals responsive to action of the directional gyroscope, a second rudder controlling inductive pick-off unit in series with said directional gyroscope pick-off, the second rudder control inductive pick-off serving to initiate signals to manipulate the control surfaces of an aircraft to effect a turn operation, a bank and climb gyroscope, having an aileron pick-off unit to generate signals responsive to action of the bank and climb gyroscope and operative in level flight conditions, a dive aileron gyroscope having a second aileron pick-off responsive to action of the dive aileron gyroscope, a second inductive aileron pick-off unit mounted in series with said bank and climb gyroscope aileron pick-off and said dive gyroscope aileron pick-off, said second aileron inductive pick-off being connected to said dive aileron gyroscope pick-off in dive condition and being connected to said bank and climb gyroscope pick-off in no dive condition, means to switch connection from the normal bank and climb gyroscope pick-off to the dive gyroscope pick-off, signals from said second inductive aileron pick-off serving to activate means to manipulate the aileron control surfaces of an aircraft, a motor responsive to input remote signals of operations to drive said second rudder inductive pick-off and said second aileron inductive pick-off simultaneously to affect turn and bank operations.

11. In remote control apparatus for controlling a pilotless aircraft elevator control apparatus comprising a normal inductive pick-off, a bank and climb gyroscope upon which said normal inductive pick-off is mounted, a dive pick-off unit operably coupled in parallel relationship with said bank and climb gyroscope pick-off, an elevator trim potentiometer and an elevator follow-up, signals from said bank and climb gyroscope pick-off being transmitted through said dive pick-off to said trim potentiometer and said elevator follow-up unit, a servo amplifier to receive the signals from the elevator follow-up and means to manipulate the elevator control of an aircraft in response to said signals, a normal pitch inductive pick-off electrically connected to said dive pick-off, said normal pitch pick-off having a rotor and a stator, a motor responsive to remote signal keying to drive the rotor of said normal pitch pick-off to introduce climb and dive signals to the normal pitch pick-off, rotation of the rotor with respect to the stator of the normal pitch pick-off feeding a signal through the dive pick-off and trim potentiometer to cause corresponding manipulation of the elevator control surface, a second motor to introduce a set dive signal to the apparatus upon keying predetermined degree of dive, the motor driving the dive pick-off thereby introducing a signal to be conveyed through the elevator trim potentiometer, elevator follow-up and servo amplifier to the means for manipulating the elevator control surface, means to drive the normal pitch pick-off to a null position upon keying the set dive operation, and means to return the dive pick-off to level position.

12. A remote control system for actuation of trim tab control in pilotless aircraft comprising means to introduce control signals, means for automatic cam actuated control of the trim tabs, said last named means including a tab transfer relay, means for keeping said tab transfer relay continuously energized in remote control conditions during radio control gear operation, a tab center relay having a normally closed pair of contacts, a level flight relay energized through said normally closed pair of tab center relay contacts, a pair of centering switches including a level centering switch and a dive centering switch, said centering switches each having at least one armature, a trim tab motor, a cam positioned by said trim tab motor, the armatures of said centering switches riding on said cam, a pair of tab relays controlled by said centering switch armatures, said tab relays controlling the motor to selectively drive said trim tabs to level flight and dive position, means to introduce a dive signal, a tab center relay energized by said dive signal, a dive relay, dive signals from said tab center relay causing power from said tab transfer relay to energize said dive relay, contacts on said dive relay, said contacts on energization of said dive relay conducting power to a dive portion of said centering switches, the armature of the dive centering switch controlling the trim tab position for dive upon receiving a dive signal.

13. Remotely controlled apparatus for pilotless aircraft including function circuits, said function circuits comprising landing gear operating means, remote landing flaps operating means, and remote cowl flaps operating means, said landing flaps operating means comprising radio channel keying means to reverse position of the landing flaps, a landing flaps relay energized by said radio channel keying means, said landing flaps relay having an armature, keying of said radio channel to energize said landing flaps relay causing said armature to be shifted, a landing flaps motor to run the flaps to extreme positions actuated by shifting of said armature, limit switches on said motor to prevent over running, an automatic rudder trim relay energized in lowered position of the landing flaps, said landing gear and cowl flaps means comprising a landing gear and cowl flap relay, means to actuate said relay, a safety switch, a landing gear motor actuated by said landing gear and cowl flap relay when in energized position, with said safety switch in the closed position, said switch being normally closed in remote control operation, the landing gear and cowl flap relay having a pair of poles, one of said poles serving to actuate said landing gear motor, a cowl flaps motor, the second pole serving to actuate the cowl flaps motor, said relays and said motors being connected to provide for the cowl flaps being normally open when the landing gear is down and the cowl flaps being normally closed when the landing gear is retracted and a cowl flap reversing switch to permit independent operation of the cowl flaps motor with respect to landing gear operation to permit bringing an aircraft engine to proper operating temperature in a shorter time prior to take-off.

14. Left and right turn circuit apparatus for controlling turn operations in remotely controlled pilotless aircraft comprising centering relay means, contacts on said centering relay means, a centering switch, said centering switch having positive voltage applied by contacts of said centering relay, a left relay circuit and a right relay circuit, a bank and turn motor, said left relay circuit and said right relay circuit controlling the bank and turn motor, an aileron pick-off and a rudder pick-off, each of said pick-offs having a stator and a rotor, said bank and turn motor operating to turn the rotor of each of said pick-offs with respect to its stator, said pick-offs being in zero signal position in centering position of said bank and turn motor, means to key a right turn, means to key a left turn, said right turn relay on keying right turn serving to drive said bank and turn motor in one direction, said left turn relays on keying left turn serving to drive said bank and turn motor in the opposite direction, said bank and turn motor on running and turning said aileron pick-off and said rudder pick-off, causing said pick-offs to introduce signals into an automatic pilot, a limit switch, said motor being turned as long as turn signals are being constantly introduced remotely, turning being limited to the limits of the limit switch, the limit switch serving to break ground of a respective one of said turn relays, said centering voltage on said centering switch being removed during keying a turn signal, the centering relay being locked-in in turn operation said centering relay removing centering voltage from said centering switch, means to cage a gyroscope in turn keying operation, dummy pick-off means substituted for said directional gyroscope means, said bank and turn motor stopping on cessation of said turn signal, centering switch means to actuate said right turn relays and said left turn relays to remove locking voltage from said centering relay, said centering relay serving to restore said bank and turn motor to center position.

15. In a remotely controlled aircraft having an automatic pilot, means for changing attitude of the aircraft for dive and climb maneuvers from a remote station comprising means to remotely key dive and climb signals, means to receive said signals in selective channels, a climb relay having a plurality of contacts, a 24-volt source keying of a climb signal causing energization of said climb relay through said source, a 24-volt pitch motor, contacts of said climb relay on being energized serving to place 24 volts of said source on said pitch motor, said pitch motor running as long as said signal is keyed, a pitch pick-off driven by said pitch motor to introduce a climb signal into the automatic pilot, said pitch motor having a limit switch, said limit switch breaking ground connection of said climb relay to prevent excessive signal duration, a pitch relay responsive to remotely keyed dive signals, said pitch relay having a contact, the contact of the pitch relay on being energized supplying said 24-volt source to said pitch motor and being connected so as to drive said pitch motor in a direction opposite from its driven direction when a climb signal is introduced, said pitch motor turning said pick-off in an opposed direction to climb direction deviation on initiation of a dive signal to introduce said dive signal to the automatic pilot, a centering switch for said pitch motor, a centering relay applying positive voltage to said centering switch to run said pitch motor to centre position, said centering switch energizing said climb relay or said pitch relay selectively to drive said pitch motor to center position, means for remotely keying a preset comparatively large angle dive, a dive relay energized by said predetermined dive keying signal, said dive relay having a contact connected to a relatively low D.C. voltage source and to said centering switch to center said pitch motor in predetermined dive signal condition, an elevator rate control electrically connected to said pitch pick-off to regulate the amount of signal introduced to the automatic pilot for any given rate displacement, an elevator trim control, a servo amplifier, a follow-up coupled to receive the displacement of an elevator control surface of said aircraft and electrically interconnected between said servo amplifier and said elevator trim control, and means connected to the output circuit of said servo amplifier and responsive to said dive and climb signals for actuating the elevator control surface of said aircraft.

16. In a remotely controlled aircraft having means for controlling maneuvers of said aircraft from a remote point, apparatus to effect a predetermined dive and a level recovery, said apparatus comprising dive relay means including a dive relay circuit, a dive limit switch, means to actuate said dive relays by remotely keying a dive signal, said dive relay means being energized upon keying of the dive signal, a dive motor supplied with power by said dive relays, said dive motor running as long as dive is keyed or until a dive limit switch opens said dive relay circuit, a pair of dive transfer relays, a post-pull-out relay to generate a lock-in voltage on said dive transfer relays, a dive inductive pick-off having a rotor and a stator, the rotor of the dive pick-off being mechanically linked to the dive and level motor so as to turn during turning of said motor to introduce a dive signal into an automatic pilot, a dive uncage relay, a normal flight elevator and aileron gyroscope and a dive aileron gyroscope, a pick-off on said normal elevator and aileron gyroscope for elevator control, a pick-off on said normal elevator and aileron gyroscope for aileron control, a pick-off on said dive aileron gyroscope, one of said dive transfer relays serving to transfer said aileron signal from said normal aileron pick-off to said dive aileron pick-off in dive operation, the dive uncage relay serving to uncage said dive aileron gyroscope in dive operation, means to remove normal centering voltage from an automatic rudder trim and apply a voltage to a follow-up centering switch of said automatic rudder trim when a turn is not being keyed, means to remove a normal centering voltage from an automatic elevator trim, means to apply a follow-up centering voltage to said automatic elevator trim when either of dive and level are not being keyed, means to energize a tab centering relay during a dive to operate trim tab circuits, means to apply a centering voltage to a pitch centering switch when dive is keyed, means to apply a voltage to a dive throttle centering switch during energization of said dive transfer relays, means to energize a level relay to run said dive and level motor toward the level limit of said dive limit switch when level is keyed, altitude switch means to automatically key said level operation, post-pull-out-means, means to initiate said post-pull-out means, said post-pull-out means including the post-pull-out relay, the post-pull-out relay when keyed serving to unlock the dive transfer relays, the dive transfer relays when unlocked applying a normal follow-up voltage to the automatic trim units, removing dive centering voltage from the trim tab circuits, removing dive throttle voltages, transferring aileron signal from the dive aileron pick-off to the normal aileron pick-off and serving to cage the dive aileron gyroscope.

17. In a remotely controlled pilotless aircraft, a dive recovery flap mechanism comprising a dive recovery circuit including a dive recovery relay having normally closed contacts, a motor holding dive recovery flaps in a normally closed position, said motor having power applied through the normally closed contacts of said dive recovery relay, a first dive transfer relay and a second dive transfer relay, means to apply arming voltage to the dive recovery circuit when said dive transfer relays are in locked-in condition, an altitude switch normally set for automatic pull-out, a second altitude switch set for an altitude lower than the setting of said first altitude switch, a differential pressure switch operated by differential pressure across elevator servos, voltage being conducted to said differential pressure switch when said second altitude switch is in closed position, an open flaps relay, said open flaps relay being energized by closing operation of said differential pressure switch, a time delay motor having an open limit and a normal limit, a time delay motor limit switch to set said open limit, said open flaps relay upon being energized causing said time delay motor to run toward the open limit, a close flaps relay, said close flaps relay upon being energized serving to run said time delay motor toward its normal limit, opening of said differential pressure switch before said time delay motor reaches its limit serving to cause said open flaps relay to drop out and energize said close flaps relay to run said time delay motor toward its normal limit, said time delay motor having a time of approximately four seconds to reach its open limit, a time delay switch closed by running of said time delay motor to its upper limit, voltage from said dive transfer relays being placed through a coil of said dive recovery relay to lock it in by closing of said time delay switch, a dive recovery motor to run out said dive recovery flaps, said dive recovery motor being actuated by said dive recovery relay when said dive recovery relay is in energized position, said dive recovery relay being unlocked when said dive transfer relay is in unenergized position, post-pull-out means to remove voltage from said dive transfer relay to close said flaps.

18. In a remotely controlled aircraft for pilotless operation having a rudder circuit and a brake circuit, an automatic brake system comprising means to apply a brake signal from a remote point, means to receive said signal, a brake transfer relay, a brake uncaging relay, a control valve relay and a brake box brake transfer relay, said brake signals serving to energize said brake transfer relay, said brake uncaging relay, said control valve relay and said brake box brake transfer relay, a rudder trim potentiometer, a brake trim potentiometer, said brake transfer relay on being energized serving to transfer a rudder signal from said rudder trim potentiometer to said brake trim potentiometer, a turn pick-off unit, a rudder rate potentiometer, a brake rate potentiometer, said brake transfer relay upon being energized transferring voltage of the turn pick-off from said rudder rate potentiometer to the brake rate potentiometer, a directional gyroscope, said directional gyroscope normally being caged on application of a turn signal, said brake uncaging relay in energized position serving to prevent caging of said directional gyroscope on turn signals, a rudder follow-up unit and a brake follow-up, said brake box brake transfer relay transferring rudder signal from the rudder follow-up to the brake follow-up, an on-off valve, said on-off valve being open when said control valve is energized to apply hydraulic pressure to the brake system, means to introduce a rate signal to the rudder circuit in automatic brake operating condition, a sensitivity potentiometer to control sensitivity of said brake follow-up, a brake transfer valve, said brake box brake transfer relay in energized condition transferring power from the rudder circuit to the brake circuit to supply power for the brake transfer valve.

19. A remotely controlled automatic brake system for pilotless aircraft including a brake circuit, comprising selective channel radio means to introduce a brake signal from a ground station to a pilotless aircraft, a brake transfer relay, a brake uncaging relay, a control valve relay and a brake box brake transfer relay, said relays being energized upon application of said brake signal, a rudder trim potentiometer and a brake trim potentiometer, contacts on said brake transfer relay transferring a rudder signal from said rudder trim potentiometer to said brake trim potentiometer when said brake transfer relay is energized, a rudder rate potentiometer and a brake rate potentiometer, a turn pick-off, said brake transfer relay on being energized serving to transfer voltage of the turn pick-off from said rudder rate potentiometer to said brake rate potentiometer, a directional gyroscope, said brake uncaging relay preventing caging of said directional gyroscope in braking condition on application of a turn signal, a rudder follow-up, a brake follow-up, said brake box brake transfer relay serving on being energized to transfer rudder control from said rudder follow-up to said brake follow-up, an on-off valve, said control valve relay in energized position serving to open said on-off valve to apply hydraulic pressure to a brake system, a transformer, a rate gyroscope driven by said transformer, an inductive pick-off positioned by said rate gyroscope, a rate signal being introduced by said transformer, rate gyroscope and inductive pick-off, a second transformer, a rudder signal circuit, the rate signal being introduced to the rudder signal circuit through the second transformer, a brake follow-up sensitivity potentiometer to control sensitivity of the brake follow-up, a brake transfer valve, said brake box brake transfer relay having means to transfer power for the transfer valve from said rudder circuit to said brake circuit, thereby providing automatically controlled remote operation for brakes operation by transferring the directional control system from the rudder circuit to the hydraulic brake circuit and adding a rate gyroscope signal to said directional signal so that said aircraft is held to both rate and displacement gyroscope reference, permitting retarding of the aircraft to a relatively fast stop and permitting slight turns to be made with the brakes as the aircraft rolls to a stop.

20. Automatic follow-up trim apparatus for application to remote control operation of pilotless aircraft comprising means to introduce a dive signal into an automatic pilot, dive transfer relay means having contacts actuated thereby, a normal centering switch, a voltage source, one of said dive transfer relay contacts being normally closed during level flight to provide voltage on said normal centering switch from said source, a follow-up unit having a rotor and a stator, a stator positioning motor having a shaft coupled to said stator and responsive to the voltage at said centering switch for driving said follow-up stator to a preset position in level flight to permit said follow-up to be used as a conventional follow-up unit, a pair of relays controlling said motor, a follow-up centering switch positioned by said follow-up rotor, means to transfer voltage from said normal centering switch to said follow-up centering switch, transfer of said voltage causing energizing of said motor driving relays to cause said motor to drive the follow-up stator to slowly follow any displacement of said rotor, thereby cancelling errors introduced by change of average center position of the rotor.

21. A remote control system for pilotless aircraft comprising, a transmitter for transmitting a plurality of channel frequencies, a channel selector receiver mounted in an aircraft, a plurality of gyroscopes including a gyroscope having a horizontal spin axis for rudder control, a dive gyroscope and a bank and climb gyroscope, said bank and climb gyroscope being a level flight bank and climb gyroscope controlling at all times elevator and aileron surfaces during approximately level attitudes, said dive gyroscope controlling aileron surfaces during steep dive operations, a caging mechanism to cage said rudder control gyroscope and to uncage said dive gyroscope in response to receiving selective signals from said transmitter, said level flight, bank and climb gyroscope having a spin axis disposed at a predetermined fixed angle from the vertical, said dive gyroscope having a spin axis in a horizontal plane, at least one inductive pick-off mounted on each of said gyroscopes, a servo amplifier in the circuit of each of said gyroscope pick-offs, signals from said pick-offs being fed respectively to said servo amplifier and amplified and rectified therein, a transfer valve coupled to the output of each of said servo amplifiers to convert said rectified and amplified electrical signals to hydraulic signals, a plurality of servo motors, said servo motors being actuated by said transfer valve output hydraulic signals, linkage mechanism driven by said servos and connected to the control surfaces of the aircraft, action of said servo motors in response to said hydraulic signals causing said linkage to manipulate the control surfaces of the aircraft, a plurality of second inductive pick-off units each connected respectively in the circuit between said gyroscope pick-offs and said servo amplifier, means to cause said inductive pick-off units to initiate a signal in response to signal operations from said transmitter, follow-up devices for each of said gyroscopic devices, said follow-up devices being linked to said control surfaces and respectively electrically connected in the output circuit of each of said servo amplifiers thereby being actuated by movement of said control surfaces and generating a voltage to restore the surfaces to neutral position on effecting operations, means to perform selective throttle settings, and means to perform braking operations, said last-named means comprising pick-off means to initiate signals for performing said braking operations upon receiving signals from said transmitter.

References Cited in the file of this patent
UNITED STATES PATENTS

| | | |
|---|---|---|
| 1,802,305 | Augustine | Apr. 21, 1931 |
| 2,369,845 | Noxon | Feb. 20, 1945 |
| 2,393,124 | Smith | Jan. 15, 1946 |
| 2,464,629 | Young | Mar. 15, 1949 |
| 2,471,821 | Kutzler et al. | May 31, 1949 |
| 2,476,400 | Berkholder | July 19, 1949 |
| 2,515,254 | Nosker | July 18, 1950 |
| 2,522,893 | Purington | Sept. 19, 1950 |
| 2,603,433 | Nosker | July 15, 1952 |
| 2,620,148 | Baring-Gould et al. | Dec. 2, 1952 |
| 2,769,601 | Hagopian et al. | Nov. 6, 1956 |